US012757209B2

(12) United States Patent
Liu et al.

(10) Patent No.: US 12,757,209 B2
(45) Date of Patent: Oct. 6, 2026

(54) NODE DEVICE AND METHOD OF WIRELESS COMMUNICATION FOR TRANSMITTING PUCCH

(71) Applicant: QUECTEL WIRELESS SOLUTIONS CO., LTD., Shanghai (CN)

(72) Inventors: Zheng Liu, Shanghai (CN); Zhongzhi Yang, Shanghai (CN)

(73) Assignee: QUECTEL WIRELESS SOLUTIONS CO., LTD., Shangahi (CN)

( * ) Notice: Subject to any disclaimer, the term of this patent is extended or adjusted under 35 U.S.C. 154(b) by 280 days.

(21) Appl. No.: 18/584,781

(22) Filed: Feb. 22, 2024

(65) Prior Publication Data

US 2024/0196405 A1 Jun. 13, 2024

Related U.S. Application Data

(63) Continuation of application No. PCT/CN2021/133361, filed on Nov. 26, 2021.

(30) Foreign Application Priority Data

Aug. 30, 2021 (CN) ......................... 202111002528.9

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04W 72/0446* (2013.01); *H04W 72/0453* (2013.01); *H04W 76/20* (2018.02)

(58) Field of Classification Search
CPC ............. H04W 72/21; H04W 72/0446; H04W 72/0453; H04W 76/20; H04L 1/1812;
(Continued)

(56) References Cited

U.S. PATENT DOCUMENTS

| | | | | |
|---|---|---|---|---|
| 2020/0145167 | A1* | 5/2020 | Jung ..................... | H04L 1/1861 |
| 2021/0051673 | A1 | 2/2021 | Chae et al. | |

(Continued)

FOREIGN PATENT DOCUMENTS

| | | | |
|---|---|---|---|
| CN | 102577209 | A | 7/2012 |
| CN | 110401980 | A | 11/2019 |
| WO | 2020213986 | A1 | 10/2020 |

OTHER PUBLICATIONS

International Search Report for PCT application No. PCT/CN2021/133361, dated Feb. 21, 2022.

(Continued)

*Primary Examiner* — Gary Mui
*Assistant Examiner* — Yewon Kim
(74) *Attorney, Agent, or Firm* — Westbridge IP LLC

(57) ABSTRACT

A method and a device used in wireless communication nodes are disclosed. A first receiver receiving a first signal, and a first transmitter sending a first bit block and a second bit block in a first PUCCH. The resources occupied by the first PUCCH belong to a first resource set, the first resource set belongs to a first resource pool, the first resource pool includes multiple resource sets, and the first signal is used to determine the first resource set from the first resource pool. A first value is equal to a sum of a number of bits included in the first bit block and the number of bits included in the second bit block, a second value is linearly related to the number of bits included in the first bit block or the second bit block, and the second value is not equal to the first value.

9 Claims, 6 Drawing Sheets

(51) Int. Cl.
*H04W 72/0446* (2023.01)
*H04W 72/0453* (2023.01)
*H04W 76/20* (2018.01)

(58) Field of Classification Search
CPC . H04L 1/1854; H04L 2001/0093; H04L 1/18; H04L 1/1861
See application file for complete search history.

(56) References Cited

U.S. PATENT DOCUMENTS

| | | | | |
|---|---|---|---|---|
| 2021/0152292 | A1 | 5/2021 | Fu et al. | |
| 2021/0368528 | A1 * | 11/2021 | Yoshimura | H04W 72/1273 |
| 2022/0039088 | A1 * | 2/2022 | Zhang | H04L 1/0073 |
| 2022/0132496 | A1 * | 4/2022 | Lu | H04L 5/0053 |
| 2022/0303063 | A1 * | 9/2022 | Mu | H04W 72/23 |
| 2023/0299904 | A1 * | 9/2023 | Zhang | H04L 1/1887 |
| 2024/0322979 | A1 * | 9/2024 | Marinier | H04L 1/1861 |

OTHER PUBLICATIONS

Written Opinion of International Searching Authority for PCT application No. PCT/CN2021/133361, dated Feb. 21, 2022.
European Search Report issued in counterpart European Patent Application No. EP 21955768.3, dated Jun. 26, 2025.
Moderator (Huawei), FL summary#7 on improving reliability for MBS for RRC_CONNECTED UEs, R1-2108641, 3GPP TSG RAN WG1 #106-e, dated Aug. 28, 2021.
Zte, Discussion on mechanisms to Improve Reliability for RRC_CONNECTED UEs, R1-2106746, 3GPP TSG RAN WG1 #106-e, dated Aug. 7, 2021.

* cited by examiner

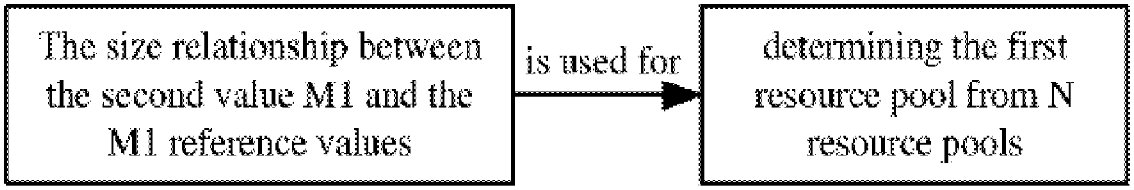
Figure 8
The second value=the number of bits included in the first bit block+the first weight value × the number of bits included in the second bit block
Figure 9
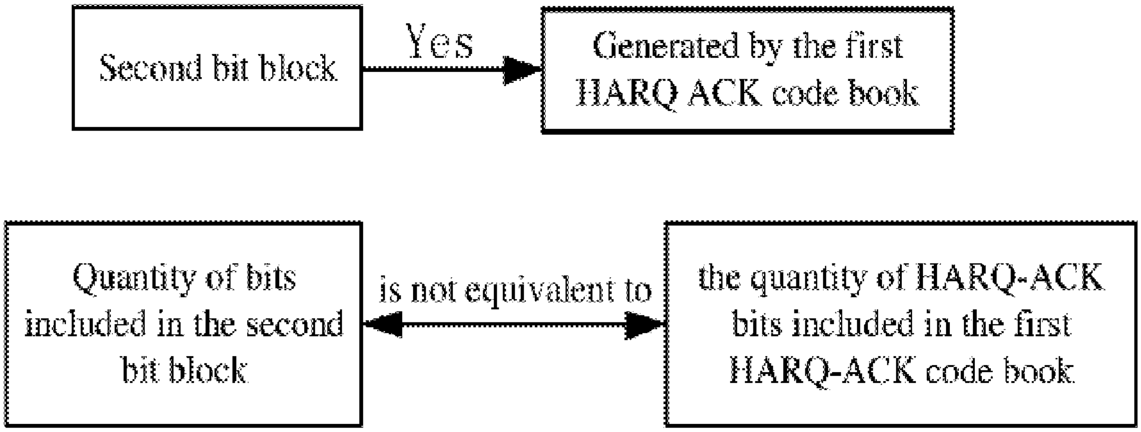
Figure 10
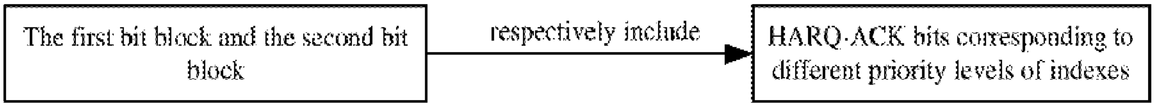
Figure 11

NODE DEVICE AND METHOD OF WIRELESS COMMUNICATION FOR TRANSMITTING PUCCH

CROSS REFERENCE TO RELATED APPLICATIONS

This application is a continuation of International Patent Application No. PCT/CN2021/133361, filed on Nov. 26, 2021, which claims priority to Chinese Patent Application No. 202111002528.9, filed on Aug. 30, 2021. All contents of the aforementioned patent applications are incorporated by reference in this application.

TECHNICAL FIELD

The application relates to a transmission method and a device in wireless communication systems, in particular to a transmission solution and a device supporting wireless signals in cellular wireless communication systems.

BACKGROUND

In the 3GPP (3rd Generation Partner Project) NR (New Radio) system, in order to support URLLC (Ultra Reliable and Low Latency Communication) services with higher requirements (such as higher reliability and lower latency), the NR Release 16 version now supports various enhancements for uplink transmission.

In the WI (Work Item), which continues to be enhanced for the NR Release 17 version of URLLC, the multiplexing of different services (Intra-UE) within UE (User Equipment) is an area that needs to be studied.

SUMMARY

When high priority (corresponding to URLLC service) HARQ-ACK (Hybrid Automatic Repeat reQuest ACKnowledgement) and low priority (corresponding to eMBB (enhanced Mobile Broadband) service) HARQ-ACK are multiplexed to the same PUCCH (Physical Uplink Control Channel), how to accurately determine the corresponding PUCCH resource set is a key problem that needs to be solved. Multiplying the sum of the number of high priority HARQ-ACK bits and the scaling value by the number of low priority HARQ-ACK bits to determine the PUCCH resource set is a solution under discussion. After adopting this solution, when the number of high priority HARQ-ACK bits is equal to 1 and the number of low priority HARQ-ACK bits is greater than 1, the result obtained by multiplying the sum of the number of high priority HARQ-ACK bits and the scaling ratio by the number of low priority HARQ-ACK bits may be less than 2, resulting in improper selection of PUCCH resource sets (such as selecting PUCCH resource sets that can only support the transmission of up to 2 bits). How to reasonably adjust the determination method of PUCCH resource set is an important issue that must be considered.

For the issues above, this application discloses a solution. It should be noted that although the above description uses HARQ-ACK in the uplink as an example, this application is also applicable to other scenarios, such as downlink, sidelink, and others, and has achieved a similar technical outcome. In addition, adopting a unified solution for different scenarios (including but not limited to uplink, downlink and side links) can also help reduce hardware complexity and cost, or improve performance. Without any conflict, the embodiments, and the features within the embodiments, in any node of the application can be applied to any other node. Without any conflict, the embodiments of the application, and the features within the embodiments, can be arbitrarily combined with each other.

As an embodiment, the interpretation of the terminologies in this application is based on the definition of the TS36 series of 3GPP specification protocols.

As an embodiment, the interpretation of the terminologies in this application is based on the definition of the TS38 series of 3GPP specification protocols.

As an embodiment, the interpretation of the terminologies in this application is based on the definition of the TS37 series of 3GPP specification protocols.

As an embodiment, the terminologies in this application are interpreted with reference to the definitions in the IEEE (Institute of Electrical and Electronics Engineers) specification protocol.

This application discloses a method for the first node in wireless communication, characterized by comprising the following:

Receiving the first signal;

Sending a first bit block and a second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As an embodiment, the problem to be solved in this application includes: how to reasonably use the product of the sum of the number of high priority HARQ-ACK bits and a scaling ratio value multiplied by the number of low priority HARQ-ACK bits to determine the PUCCH resource set.

As an embodiment, the problem to be solved in this application includes: how to reasonably use the number of bits included in the first bit block and the number of bits included in the second bit block to determine the PUCCH resource set to ensure that the following problem will not occur: when the first value is greater than 2, the determined PUCCH resource set can only support up to 2 bits.

As an embodiment, the advantages of the above method include the following: it ensures that the PUCCH resources in the determined PUCCH resource set are sufficient to support the transmission of the first and second bit blocks.

As an embodiment, the advantages of the above method include the following: it avoids the potential errors that can arise after introducing a new selection method for PUCCH resource sets.

As an embodiment, the advantages of the above method include the following: it ensures that the error of incorrect selection of PUCCH format 0 or PUCCH format 1 does not occur when one high priority HARQ-ACK bit and multiple low priority HARQ-ACK bits are multiplexed.

As an embodiment, the advantages of the above method include the following: the PUCCH resource set is more accurately selected based on the number of HARQ-ACK bits with different priorities, which is beneficial for improving resource utilization.

As an embodiment, the advantages of the above method include the following: good forward compatibility.

As an embodiment, the advantages of the above method include the following: after introducing a new selection method for PUCCH resource sets, the workload required to develop a new version of the 3GPP technical specification is small.

According to an aspect of this application, the above method is characterized by the following:

The first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, while the fourth value is constant or configurable; and N is a positive integer greater than 1, while the first reference value is not less than 2.

As an embodiment, the characteristics of the above method include the following: the third value can ensure that the resource set determined in the first resource pool is sufficient to support the transmission of the first bit block and the second bit block.

As an embodiment, the characteristics of the above method include the following: when the first value is greater than the first reference value, the maximum value of the fourth value and the second value is used to ensure that the value used to determine the first resource pool is not less than the fourth value, thereby ensuring that the resource set in the determined first resource pool is sufficient to support the transmission of the first bit block and the second bit block.

According to an aspect of this application, the above method is characterized by the following:

The size relationship between the third value and M2 reference values is used to determine the first resource pool from the N resource pools. The M2 reference values are different from each other, while M2 is a positive integer greater than 1.

According to an aspect of this application, the above method is characterized by the following:

The first resource pool is one of N resource pools; when the first value is not greater than the first reference value, the first resource pool is the default resource pool among the N resource pools; when the first value is greater than the first reference value, the second value is used to determine the first resource pool from the N resource pools; N is a positive integer greater than 1, and the first reference value is not less than 2.

According to an aspect of this application, the above method is characterized by the following:

When the first value is greater than the first reference value, the size relationship between the second value and M1 reference values is used to determine the first resource pool from the N resource pools; the M1 reference values are different from each other, the minimum value among the M1 reference values is greater than the first reference value, and M1 is a positive integer.

According to an aspect of this application, the above method is characterized by the following:

When the first value is greater than the first reference value: regardless of whether the second value is greater than the first reference value, the first resource pool is a resource pool other than the default resource pool among the N resource pools.

As an embodiment, the characteristics of the above method include the following: when it has been determined that the first value is greater than the first reference value, the first reference value is no longer used for size comparison with the second value in the process of determining the first resource pool.

As an embodiment, the advantages of the above method include the following: unnecessary size comparisons between the second value and the first reference value are avoided, thus eliminating the risk of unsuitable selection of PUCCH resource sets.

According to an aspect of this application, the above method is characterized by the following:

The second value is equal to the product of the sum of the number of bits included in the first bit block and the first weight value and the number of bits included in the second bit block. The first weight value is default, configurable, or rate dependent.

According to an aspect of this application, the above method is characterized by the following:

The second bit block is generated by the first HARQ-ACK codebook, and the number of bits included in the second bit block is not equal to the number of HARQ-ACK bits included in the first HARQ-ACK codebook.

As an embodiment, the characteristics of the above method include the following: the low-priority HARQ-ACK codebook is compressed into D bits and then sent, wherein D is a constant or a positive integer indicated by DCI or a positive integer configured for higher-level signaling.

As an embodiment, the advantages of the above method include the following: impact of inconsistent understanding of the number of low-priority HARQ-ACK bits by both communication parties on the feedback performance of high-priority HARQ-ACK is reduced (or avoided).

As an embodiment, the advantages of the above method include the following: the impact of high priority HARQ-ACK feedback performance caused by missed detection of low priority DCI is reduced (or avoided).

This application discloses a method for a second node used in wireless communication, characterized by comprising the following:

sending the first signal;

receiving a first bit block and a second bit block in the first PUCCH, wherein the first bit block comprises at least one bit, and the second bit block comprises at least one bit; Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

According to an aspect of this application, the above method is characterized by the following:

The first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, while the fourth value is constant or configurable; and N is a positive integer greater than 1, while the first reference value is not less than 2.

According to an aspect of this application, the above method is characterized by the following:

The size relationship between the third value and M2 reference values is used to determine the first resource pool from the N resource pools. The M2 reference values are different from each other, while M2 is a positive integer greater than 1.

According to an aspect of this application, the above method is characterized by the following:

The first resource pool is one of N resource pools; when the first value is not greater than the first reference value, the first resource pool is the default resource pool among the N resource pools; when the first value is greater than the first reference value, the second value is used to determine the first resource pool from the N resource pools; N is a positive integer greater than 1, and the first reference value is not less than 2.

According to an aspect of this application, the above method is characterized by the following:

When the first value is greater than the first reference value, the size relationship between the second value and M1 reference values is used to determine the first resource pool from the N resource pools; the M1 reference values are different from each other, the minimum value among the M1 reference values is greater than the first reference value, and M1 is a positive integer.

According to an aspect of this application, the above method is characterized by the following:

When the first value is greater than the first reference value: regardless of whether the second value is greater than the first reference value, the first resource pool is a resource pool other than the default resource pool among the N resource pools.

According to an aspect of this application, the above method is characterized by the following:

The second value is equal to the product of the sum of the number of bits included in the first bit block and the first weight value and the number of bits included in the second bit block. The first weight value is default, configurable, or rate dependent.

According to an aspect of this application, the above method is characterized by the following:

The second bit block is generated by the first HARQ-ACK codebook, and the number of bits included in the second bit block is not equal to the number of HARQ-ACK bits included in the first HARQ-ACK codebook.

The application discloses a device used in the first node of wireless communication, which is characterized by comprising:

the first receiver which receives the first signal;

the first transmitter, which sends a first bit block and a second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

The application discloses a device used in the second node of wireless communication, which is characterized by comprising:

The second transmitter which sends the first signal;

The second receiver which receives the first bit block and the second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As an embodiment, the method described in this application has the following advantages:

the PUCCH resources in the determined PUCCH resource set are sufficient to support the transmission of HARQ-ACKs with different priorities, which are multiplexed;

It avoids any errors caused by introducing a new selection method for PUCCH resource sets.

It ensures that the incorrect selection of PUCCH format 0 or PUCCH format 1 does not occur when one high priority HARQ-ACK bit and multiple low priority HARQ-ACK bits are multiplexed.

It is conducive to selecting PUCCH resource sets more accurately and improving resource utilization efficiency;

The impact of inconsistent understanding of the number of low-priority HARQ-ACK bits by both communication parties on the feedback performance of high-priority HARQ-ACK is reduced (or avoided).

It ensures high priority HARQ-ACK transmission performance;

It involves minor changes to the 3GPP protocol.

This application discloses a method for the first node in wireless communication, characterized by comprising the following:

Receiving the first signal;

Sending a first bit block and a second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As an embodiment, the problem to be solved in this application includes the following: how to reasonably configure the reference value used for size comparison with a third value to determine the PUCCH resource set.

As an embodiment, the problem to be solved in this application includes the following: how to reasonably configure the reference value used for size comparison with a third value to ensure that the following situation does not occur: when the total number of HARQ-ACK bits with different priorities is greater than 2, the determined PUCCH resource set can only support up to 2 bits.

As an embodiment, the advantages of the above method include the following: it avoids the potential errors that can arise after introducing a new selection method for PUCCH resource sets.

As an embodiment, the advantages of the above method include the following: the incorrect selection of PUCCH format 0 or PUCCH format 1 when one high priority HARQ-ACK bit and multiple low priority HARQ-ACK bits are multiplexed can be avoided.

As an embodiment, the advantages of the above method include the following: the PUCCH resource set is more accurately selected based on the number of HARQ-ACK bits with different priorities, which is beneficial for improving resource utilization.

As an embodiment, the advantages of the above method include the following: good forward compatibility.

As an embodiment, the advantages of the above method include the following: after introducing a new selection method for PUCCH resource sets, the workload required to develop a new version of the 3GPP technical specification is small.

According to an aspect of this application, the above method is characterized by the following:

One of the M2 reference values is greater than 1 and less than 2.

According to an aspect of this application, the above method is characterized by the following:

One of the M2 reference values is equal to 1 plus the first weight value. The first weight value is default, configurable, or rate dependent.

According to an aspect of this application, the above method is characterized by the following:

The third value is the second value.

According to an aspect of this application, the above method is characterized by the following:

The second value is equal to the product of the sum of the number of bits included in the first bit block and the first weight value and the number of bits included in the second bit block. The first weight value is default, configurable, or rate dependent.

According to an aspect of this application, the above method is characterized by the following:

The second bit block is generated by the first HARQ-ACK codebook, and the number of bits included in the second bit block is not equal to the number of HARQ-ACK bits included in the first HARQ-ACK codebook.

This application discloses a method for a second node used in wireless communication, characterized by comprising the following:

sending the first signal;

receiving a first bit block and a second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

According to an aspect of this application, the above method is characterized by the following:

One of the M2 reference values is greater than 1 and less than 2.

According to an aspect of this application, the above method is characterized by the following:

One of the M2 reference values is equal to 1 plus the first weight value. The first weight value is default, configurable, or rate dependent.

According to an aspect of this application, the above method is characterized by the following:

The third value is the second value.

According to an aspect of this application, the above method is characterized by the following:

The second value is equal to the product of the sum of the number of bits included in the first bit block and the first weight value and the number of bits included in the second bit block. The first weight value is default, configurable, or rate dependent.

According to an aspect of this application, the above method is characterized by the following:

The second bit block is generated by the first HARQ-ACK codebook, and the number of bits included in the second bit block is not equal to the number of HARQ-ACK bits included in the first HARQ-ACK codebook.

The application discloses a device used in the first node of wireless communication, which is characterized by comprising the first receiver which receives the first signal;

the first transmitter, which sends a first bit block and a second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

According to an aspect of this application, the above node device is characterized by the following:

One of the M2 reference values is greater than 1 and less than 2.

According to an aspect of this application, the above node device is characterized by the following:

One of the M2 reference values is equal to 1 plus the first weight value. The first weight value is default, configurable, or rate dependent.

According to an aspect of this application, the above node device is characterized by the following:

The third value is the second value.

According to an aspect of this application, the above node device is characterized by the following:

The second value is equal to the product of the sum of the number of bits included in the first bit block and the first weight value and the number of bits included in the second bit block. The first weight value is default, configurable, or rate dependent.

According to an aspect of this application, the above node device is characterized by the following:

The second bit block is generated by the first HARQ-ACK codebook, and the number of bits included in the second bit block is not equal to the number of HARQ-ACK bits included in the first HARQ-ACK codebook.

The application discloses a device used in the second node of wireless communication, which is characterized by comprising:

The second transmitter which sends the first signal;

The second receiver which receives the first bit block and the second bit block in the first PUCCH, wherein the first bit block comprises at least one bit, and the second bit block comprises at least one bit;

Among them, the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

BRIEF DESCRIPTION OF DRAWINGS

Other features, objectives and advantages of the application will become more apparent by reading the detailed description of non-limiting embodiments with reference to the following drawings:

FIG. 8 shows a schematic diagram of the size relationship between the second value and the M1 reference values, as well as the relationship between the first resource pools, according to an embodiment of this application;

FIG. 9 shows a schematic diagram for the description of the second value according to an embodiment of this application;

FIG. 10 shows a schematic diagram of the relationship between a second bit block and a first HARQ-ACK codebook according to an embodiment of this application;

FIG. 11 shows an explanatory diagram of the first and second bit blocks according to an embodiment of this application;

DETAILED DESCRIPTION

The technical solution of this application is further described in detail in combination with the drawings. It shall describe that, without any conflict, the embodiments of the application, as well as the features within the embodiments, can be arbitrarily combined with each other.

Embodiment 1

Figure 1:
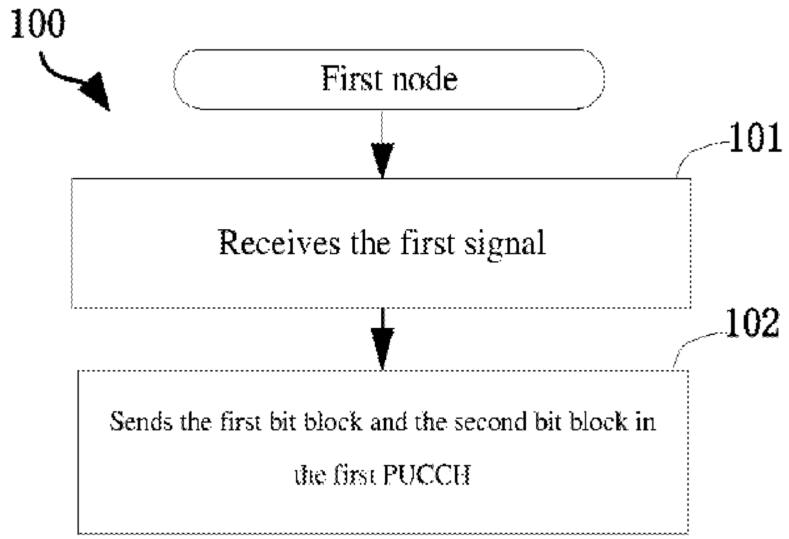
FIG. 1 shows a process flow diagram for the first node of an embodiment according to the application.

Embodiment 1 shows a process flow diagram for the first node of an embodiment according to the application, as shown in FIG. 1.

In Embodiment 1, the first node in this application receives the first signal in step 101. In step 102, the first and second bit blocks are sent in the first PUCCH.

In Embodiment 1, the first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As an embodiment, the first signal is a physical layer signal.

As an embodiment, the first signal is DCI (Downlink control information).

As an embodiment, the first signal includes one or more domains in DCI.

As an embodiment, the first signal is a Higher Layer signal.

As an embodiment, the first signal is a RRC signal.

As an embodiment, the first signal includes one or more domains in RRC.

As an embodiment, the first signal includes an IE (Information Element).

As an embodiment, the first signal includes one or more domains in one IE.

As an embodiment, the first signal is an MAC CE signal.

As an embodiment, the first signal includes one or more domains in MAC CE.

As an embodiment, the first signal is a DownLink Grant signal.

As an embodiment, the first signal is an UpLink Grant signal.

As an embodiment, the first signal includes an information element SPS-Config.

As an embodiment, the first signal includes an information element ConfiguredGrantConfig.

As an embodiment, the first signal is a DCI indicating priority index 1.

As an embodiment, a priority indicator domain in the first signal indicates priority index 1.

As an embodiment, the first bit block is subjected to at least part of the CRC attachment, code block segmentation, code block CRC attachment, channel encoding, rate matching, code block cascading, scrambling, modulation, spreading, layer mapping, precoding, mapping to physical resources, and multi-carrier symbol generation, modulation and upconversion, and then sent in the first PUCCH.

As an embodiment, the second bit block is subjected to at least part of the CRC attachment, code block segmentation, code block CRC attachment, channel encoding, rate matching, code block cascading, scrambling, modulation, spreading, layer mapping, precoding, mapping to physical resources, and multi-carrier symbol generation, modulation and upconversion, and then sent in the first PUCCH.

As an embodiment, the first and second bit blocks together undergo at least one of sequence generation or sequence modulation, and are then mapped to physical resources, and then sent in the first PUCCH.

As an embodiment, the first bit block and the second bit block undergo at least part of sequence generation, sequence modulation, spreading, layer mapping, precoding, mapping to physical resources, multi-carrier symbol generation and modulation and upconversion, and are then transmitted in the first PUCCH.

As an embodiment, when the first value is greater than the first reference value, the first bit block and the second bit block are respectively subjected to channel encoding.

As an embodiment, when the first value is not greater than the first reference value: the first bit block and the second bit block together undergo at least one of sequence generation or sequence modulation, and are then mapped to physical resources, then sent in the first PUCCH.

As an embodiment, when the second value is greater than the first reference value, the first bit block and the second bit block are respectively subjected to channel encoding.

As an embodiment, when the second value is not greater than the first reference value: the first bit block and the second bit block together undergo at least one of sequence generation or sequence modulation, are mapped to physical resources, and then sent in the first PUCCH.

As an embodiment, the first PUCCH is a physical uplink control channel (PUCCH).

As an embodiment, the first PUCCH is a multiplexing PUCCH specifically used for UCIs with different priority indexes.

As an embodiment, the first PUCCH is a PUCCH specifically designed for multiplexing HARQ-ACKs with different priority indexes.

As an embodiment, the first PUCCH is a PUCCH corresponding to priority index 1.

As an embodiment, the first PUCCH is a PUCCH corresponding to priority index 0.

As an embodiment, the first PUCCH uses one of PUCCH format 0, PUCCH format 1, PUCCH format 2, PUCCH format 3 and PUCCH format 4.

As an embodiment, the number of bits included in the first bit block is equal to one of 1, 2, . . . , 1706.

As an embodiment, the number of bits included in the second bit block is equal to one of 1, 2, . . . , 1706.

As an embodiment, the first bit block includes information bits reported to the base station.

As an embodiment, the second bit block includes information bits reported to the base station.

As an embodiment, both the first and second bit blocks include information bits for Sidelink communication.

As an embodiment, the first bit block comprises at least one UCI (uplink control information) bit, and the second bit block comprises at least one UCI bit.

As an embodiment, the first bit block comprises at least one HARQ-ACK bit, and the second bit block comprises at least one HARQ-ACK bit.

As an embodiment, the bits included in the first bit block are all HARQ-ACK bits.

As an embodiment, the bits included in the second bit block are all HARQ-ACK bits.

As an embodiment, a HARQ-ACK bit is a HARQ-ACK information bit.

As an embodiment, the resource occupied by the first PUCCH is a radio resource.

As an embodiment, the resource occupied by the first PUCCH includes multiple REs in the time-frequency domain.

As an embodiment, the resource occupied by the first PUCCH belongs to one PUCCH resource.

As an embodiment, the first resource set includes multiple RE (Resource Elements) in the time-frequency domain.

As an embodiment, an RE occupies one multi-carrier symbol in the time domain and one subcarrier in the frequency domain.

As an embodiment, the multi-carrier symbol in this application is an OFDM (Orthogonal Frequency Division Multiplexing) symbol.

As an embodiment, the multi-carrier symbol in this application is an SC-FDMA (Single Carrier Frequency Division Multiple Access) symbol.

As an embodiment, the multi-carrier symbol in this application is a DFT-S-OFDM (Discrete Fourier Transform Spread OFDM) symbol.

As an embodiment, the multi-carrier symbol in this application is an FBMC (Filter Bank Multi Carrier) symbol.

As an embodiment, the multi-carrier symbol in this application includes a CP (Cyclic Prefix).

As an embodiment, the first resource set includes the empty port resources occupied by the first PUCCH.

As an embodiment, the first resource set includes the time-frequency code domain resources occupied by the first PUCCH.

As an embodiment, the first resource set is the PUCCH resource to which the resource occupied by the first PUCCH belongs.

As an embodiment, the first resource set is a PUCCH resource reserved for the first PUCCH.

As an embodiment, one of the resource sets in this application includes multiple REs in the time-frequency domain.

As an embodiment, the resource set in this application includes an air resource occupied by a PUCCH.

As an embodiment, the resource set in this application includes a time-frequency code domain resource occupied by a PUCCH.

As an embodiment, one of the resource sets in this application is a PUCCH resource.

As an embodiment, the resource set in this application is configured for higher-level signaling.

As an embodiment, the resource set in this application is configured by an RRC signal.

As an embodiment, the first resource pool includes multiple REs in the time-frequency domain.

As an embodiment, the first resource pool is a PUCCH resource set.

As an embodiment, the first resource pool is configured for higher-level signaling.

As an embodiment, the first resource pool is configured by an RRC signal.

As an embodiment, the first resource pool is configured by PUCCH-ResourceSet.

As an embodiment, the number of resource sets included in the first resource pool is not greater than 8.

As an embodiment, the number of resource sets included in the first resource pool is not greater than 16.

As an embodiment, the number of resource sets included in the first resource pool is not greater than 32.

As an embodiment, the first signal is used to indicate the first resource set from the first resource pool.

As an embodiment, the first signal is used to indicate the index of the first resource set in the first resource pool.

As an embodiment, a PUCCH resource indicator domain in the first signal is used to indicate the index of the first resource set in the first resource pool.

As an embodiment, the index of the first CCE occupied by the PDCCH used for transmitting the first signal is used to determine the index of the first resource set in the first resource pool.

As an embodiment, the index of the first CCE occupied by the PDCCH used for transmitting the first signal, as well as a PUCCH resource indicator domain in the first signal, are jointly used to indicate the index of the first resource set in the first resource pool.

As an embodiment, when the number of resource sets included in the first resource pool is not greater than 8, a PUCCH resource indicator domain in the first signal is used to indicate the index of the first resource set in the first resource pool.

As an embodiment, when the number of resource sets included in the first resource pool is greater than 8, the first node determines the index $r_{PUCCH}$ of the first resource set in the first resource pool, as follows:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases},$$

Among them, $R_{PUCCH}$ is equal to the number of resource sets included in the first resource pool, $N_{CCE,p}$ is the number of CCEs (Control channel elements) in the CORESET (Control resource set) received by the PDCCH (Physical downlink control channel) for the first signal, and $n_{CCE,p}$ is the index of the first CCE received by the PDCCH for the first signal. $\Delta_{PRI}$ is the value of a PUCCH resource indicator field in the first signal. If the first signal does not include the PUCCH resource indicator field, $\Delta_{PRI}$ is equal to 0.

As an embodiment, the first value=the number of bits included in the first bit block+the number of bits included in the second bit block.

As an embodiment, the second value of the expression in this application is linearly related to the number of bits included in the first bit block. The meaning of the linear correlation between the second value and the number of bits included in the second bit block includes the following: the second value is equal to the product of the sum of the number of bits included in the first bit block and the first weight value multiplied by the number of bits included in the second bit block. The first weight value is default, configurable, or coding rate/code rate dependent.

As an embodiment, the second value of the expression in this application is linearly related to the number of bits included in the first bit block. The meaning of the linear correlation between the second value and the number of bits included in the second bit block includes the following: the second value is equal to the product of the sum of the number of bits included in the second bit block and the first weight value multiplied by the number of bits included in the first bit block. The first weight value is default, configurable, or rate dependent.

As an embodiment, the second numerical value of the expression in this application is linearly related to the number of bits included in the first bit block. The meaning of the linear correlation between the second value and the number of bits included in the second bit block includes the following: the second value is equal to the sum of the product of the second weight value multiplied by the number of bits included in the second bit block and the product of the first weight value multiplied by the number of bits included in the first bit block. The first weight value is default, configurable, or rate dependent, while the second weight value is default, configurable, or rate dependent.

As an embodiment, the second weight value is the default setting.

As an embodiment, the second weight value is configured by a higher-level signal.

As an embodiment, the second weight value is configured by an RRC signal.

As an embodiment, the second weight value is configured by an MAC CE signal.

As an embodiment, the second weight value is a numerical value between 0 and 1.

As an embodiment, the second weight value is a numerical value greater than 1.

As an embodiment, the second weight value is configured in PUCCH-Config.

As an embodiment, the second weight value is indicated by the first signal.

As an embodiment, the second weight value is equal to the ratio of the first bit rate to the second bit rate.

As an embodiment, the second weight value is equal to the ratio of the second bit rate to the first bit rate.

As an embodiment, the second weight value is equal to the ratio of 1 to the first bit rate.

As an embodiment, the second weight value is equal to the ratio of 1 to the second bit rate.

As an embodiment, the expression that the second value in this application is linearly related to the number of bits included in the first bit block, and the linear correlation between the second value and the number of bits included in the second bit block includes the following meaning: the second value=f (the number of bits included in the first bit block, the number of bits included in the second bit block); of these, f(x, y) represents a binary quadratic function with x and y as independent variables.

As an embodiment, the second value is greater than the first value.

As an embodiment, the second value is smaller than the first value.

As an embodiment, the expression in this application that both the first and second values are used to determine the first resource pool includes the following meaning: the first resource pool is one of N resource pools. When the first value is not greater than the first reference value, the first resource pool is the default resource pool among the N resource pools. When the first value is greater than the first reference value, the second value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the first value is greater than the first reference value, the first resource pool is the default resource pool among the N resource pools. When the first value is not greater than the first reference value, the second value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the first value is not less than the first reference value, the first resource pool is the default resource pool among the N resource pools. When the first value is less than the first reference value, the second value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the first value is less than the first reference value, the first resource pool is the default resource pool among the N resource pools. When the first value is not less than the first reference value, the second value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the second value is not greater than the first reference value, the first resource pool is the default resource pool among the N resource pools. When the second value is greater than the first reference value, the first value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the second value is greater than the first reference value, the first resource pool is the default resource pool among the N resource pools. When the second value is not greater than the first reference value, the first value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the second value is not less than the first reference value, the first resource pool is the default resource pool among the N resource pools. When the second value is less than the first reference value, the first value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the second value is less than the first reference value, the first resource pool is the default resource pool among the N resource pools. When the second value is not less than the first reference value, the first value is used to determine the first resource pool from the N resource pools. N is a positive integer greater than 1, and the first reference value is not less than 2.

As an embodiment, the expression in this application that both the first and second values are used to determine the first resource pool includes the following meaning: the first resource pool is one of N resource pools. When the first or second value is not greater than the first reference value, the first resource pool is the default resource pool among the N resource pools. When both the first and second values are greater than the first reference value, the first resource pool is a resource pool other than the default resource pool among the N resource pools, and the second value is used to determine the first resource pool. Nis a positive integer greater than 1, and the first reference value is not less than 2.

As an embodiment, the expression in this application that both the first and second values are used to determine the first resource pool includes the following meaning: the first resource pool is one of N resource pools; the third value is used to determine the first resource pool from the N resource pools; when the first value is not greater than the first reference value, the third value is equal to the first value;

when the first value is greater than the first reference value, the third value is equal to the maximum value of the fourth value and the second value, and the fourth value is constant or configurable; N is a positive integer greater than 1, and the first reference value is not less than 2.

As an embodiment, the expression in this application that both the first and second values are used to determine the first resource pool includes the following meaning: the first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, and the fourth value is constant or configurable; N is a positive integer greater than 1, and the first reference value is not less than 2.

As an embodiment, the expression in this application that both the first and second values are used to determine the first resource pool includes the following meaning: the first resource pool is one of N resource pools; the third value is used to determine the first resource pool from the N resource pools; when the first value is not less than the first reference value, the third value is equal to the first value; when the first value is less than the first reference value, the third value is equal to the maximum value of the fourth value and the second value, and the fourth value is constant or configurable; N is a positive integer greater than 1, and the first reference value is not less than 2.

As an embodiment, the expression in this application that both the first and second values are used to determine the first resource pool includes the following meanings: the first resource pool is one of N resource pools; the third value is used to determine the first resource pool from the N resource pools; when the first value is less than the first reference value, the third value is equal to the first value; when the first value is not less than the first reference value, the third value is equal to the maximum value of the fourth value and the second value, and the fourth value is constant or configurable; N is a positive integer greater than 1, and the first reference value is not less than 2.

As an embodiment, the expression in this application that both the first and second values are used to determine the first resource pool includes the following meanings: the first resource pool is one of N resource pools; the third value is used to determine the first resource pool from the N resource pools; when the first value is not greater than the first reference value, the third value is equal to the first value; when the first value is greater than the first reference value, the second value is used to determine the third value. N is a positive integer greater than 1, and the first reference value is not less than 2.

As a subsidiary embodiment of the above embodiment, the third value is equal to the maximum value between the fourth value and the second value, and the fourth value is constant or configurable.

As a subsidiary embodiment of the above embodiment, the third value is equal to the minimum value between the fourth value and the second value, and the fourth value is constant or configurable.

As a subsidiary embodiment of the above embodiment, the third value is equal to the smallest positive integer not less than the second value.

As a subsidiary embodiment of the above embodiment, the third value is equal to the maximum positive integer not greater than the second value.

As an embodiment, the expression in this application that both the first and second values are used to determine the first resource pool includes the following meaning: the first resource pool is one of N resource pools. When the first value is not greater than the first reference value, the first resource pool is the default resource pool among the N resource pools. When the first value is greater than the first reference value, the third value is used to determine the first resource pool from the N resource pools. The third value is equal to the maximum value between the fourth value and the second value, and the fourth value is constant or configurable. N is a positive integer greater than 1, and the first reference value is not less than 2.

As an embodiment, the second value is equal to the smallest integer not less than the first intermediate value. The first intermediate value is equal to the product of the sum of the number of bits included in the first bit block and the first weight value and the number of bits included in the second bit block. The first weight value is default, configurable, or rate dependent.

As an embodiment, the second value=ceiling (the number of bits included in the first bit block+the first weight value× the number of bits included in the second bit block). Among these, the first weight value is default, configurable, or rate dependent, and ceiling (x) represents rounding up the number x.

As an embodiment, the expression in this application that both the first and second values are used to determine the first resource pool includes the following meanings: the first resource pool is one of N resource pools; the third value is used to determine the first resource pool from the N resource pools; when the first value is not greater than the first reference value, the third value is equal to the first value. When the first value is greater than the first reference value and the second value is not greater than the fourth value, the third value is equal to the sum of the fourth values. When the first value is greater than the first reference value and the maximum value of the second value is greater than the fourth value, the third value is equal to the second value. The fourth value is constant or configurable. N is a positive integer greater than 1, and the first reference value is not less than 2.

Embodiment 2

Figure 2:
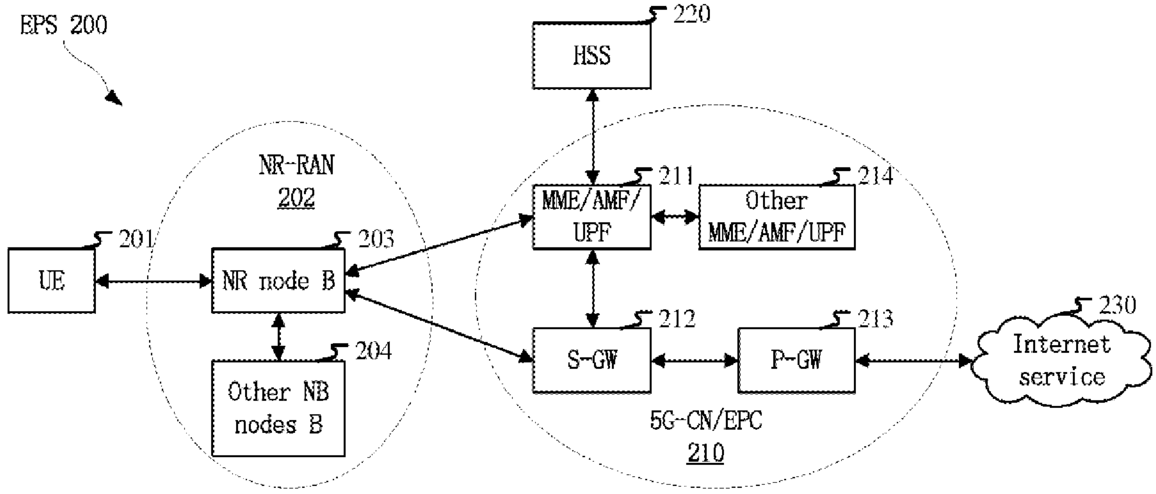
FIG. 2 shows a schematic diagram of a network architecture according to an embodiment of the application.

Embodiment 2 shows a schematic diagram of a network architecture according to this application, as shown in FIG. 2.

FIG. 2 illustrates the network architecture 200 of 5G NR, LTE (Long Term Evolution), and LTE-A (Long Term Evolution Advanced) systems. 5G NR or LTE network architecture 200 can be referred to as EPS (Evolved Packet System) 200 or some other suitable term. EPS 200 can include one or more UE (User Equipment) 201, NG-RAN (Next Generation Wireless Access Network) 202, EPC (Evolved Packet Core)/5G-CN (5G Core Network) 210, HSS (Home Subscriber Server) 220, and Internet Services 230. EPS can be interconnected with other access networks, but for the sake of simplicity, these entities/interfaces are not shown. As shown in the figure, EPS provides packet switching services, but those skilled in the field will easily understand that the various concepts presented throughout this application can be extended to networks or other cellular networks that provide circuit switching services. NG-RAN includes NR node B (gNB) 203 and other gNB204. GNB203 provides termination of user and control plane protocols towards UE201. GNB203 can be connected to other gNB204 through Xn interfaces (such as backhaul). GNB203 can also be referred to as a base station, base transceiver, radio base station, radio transceiver, transceiver function, basic service set (BSS), extended service set (ESS), TRP (sending receiving node), or some other suitable term. GNB203 provides UE201 with an access point to EPC/5G-CN 210. Embodiments of UE201 include cellular phones, smartphones, Session Initiation Protocol (SIP) phones, laptops, Personal Digital Assistants (PDAs), satellite radios, non-ground base station communication, satellite mobile communication, global positioning systems, multimedia devices, video devices, digital audio players (such as MP3 players), cameras, game consoles, drones, aircraft, narrowband IoT devices, machine type communication devices, land transportation vehicles, automobiles, wearable devices or any other similar functional device. Those skilled in the art may also refer to UE201 as a mobile station, subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client or any other suitable term. The gNB203 is connected to the EPC/5G-CN 210 through the S1/NG interface. EPC/5G-CN 210 includes MME (Mobility Management Entity)/AMF (Authentication Management Field)/UPF (User Plane Function) 211, other MME/AMF/UPF214, S-GW (Service Gateway) 212 and P-GW (Packet Date Network Gateway) 213. MME/AMF/UPF211 is a control node that handles the signal between UE201 and EPC/5G-CN 210. Generally, MME/AMF/UPF211 provides bearer and connection management. All user IP (Internet Protocol) packets are transmitted through S-GW 212, which itself connects to P-GW213. P-GW213 provides UE IP address allocation and other functions. P-GW213 connects to Internet service 230. Internet service 230 includes operator specific Internet protocol services, which can include the Internet, intranet, IMS (IP Multimedia Subsystem), and packet switching streaming services.

As an embodiment, the UE201 corresponds to the first node in this application.

As an embodiment, the UE201 corresponds to the second node in this application.

As an embodiment, the gNB203 corresponds to the first node in this application.

As an embodiment, the gNB 203 corresponds to the second node in this application.

As an embodiment, the UE201 corresponds to the first node in this application, and the gNB203 corresponds to the second node in this application.

As an embodiment, the gNB203 is a MarcoCellular base station.

As an embodiment, the gNB203 is a Micro Cell base station.

As an embodiment, the gNB203 is a PicoCell base station.

As an embodiment, the gNB203 is a Femtocell base station.

As an embodiment, the gNB203 is a base station device that supports large latency differences.

As an embodiment, the gNB203 is a flight platform device.

As an embodiment, the gNB203 is a satellite device.

As an embodiment, both the first node and the second node in this application correspond to the UE201; for example, V2X communication is performed between the first node and the second node.

Embodiment 3

Figure 3:
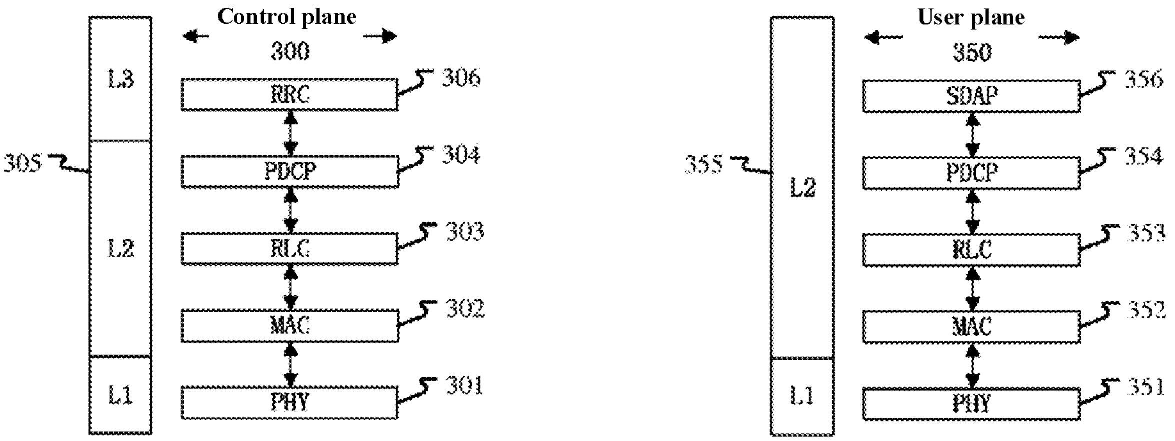
FIG. 3 shows a schematic diagram of a wireless protocol architecture of a user plane and a control plane according to an embodiment of the application.

Embodiment 3 shows a schematic diagram for an embodiment of a wireless protocol architecture in a user plane and a control plane according to an embodiment of the application, as shown in FIG. 3. FIG. 3 is a schematic diagram illustrating an embodiment of the radio protocol architecture for the user plane 350 and control plane 300. FIG. 3 displays the radio protocol architecture of the control plane 300 for the first communication node device (gNB, UE or RSU in V2X) and the second communication node device (gNB, UE or RSU in V2X), or between two UEs in three layers: layer 1, layer 2 and layer 3. Layer 1 (L1 layer) is the lowest layer and carries out various PHY (physical layer) signal processing functions. The L1 will be referred to as PHY301 in this document. Layer 2 (L2 layer) 305 is above PHY301 and is responsible for the link between the first communication node device and the second communication node device and two UEs through PHY301. L2 layer 305 includes MAC (Medium Access Control) sublayer 302, RLC (Radio Link Control Protocol) sublayer 303, and PDCP (Packet Data Convergence Protocol) sublayer 304, which all terminate at the second communication node device. The PDCP sublayer 304 provides multi-channel multiplexing between different radio bearers and logical channels. The PDCP sublayer 304 also provides security by encrypting data packets, as well as providing cross zone mobility support for the first communication node device between the second communication node devices. RLC sublayer 303 provides segmentation and reassembly of upper layer data packets, retransmission of lost data packets, and reordering of data packets to compensate for disordered reception caused by HARQ. The MAC sublayer 302 provides multi-channel multiplexing between logic and transmission channels. The MAC sublayer 302 is also responsible for allocating various radio resources (such as resource blocks) in a cell between the first communication node devices. The MAC sublayer 302 is also responsible for HARQ operations. The RRC (Radio Resource Control) sublayer 306 in Layer 3 (L3) in control plane 300 is responsible for obtaining radio resources (i.e., radio bearers) and configuring the lower layer by means of RRC signaling between the second communication node device and the first communication node device. The radio protocol architecture of user plane 350 includes layer 1 (L1 layer) and layer 2 (L2 layer). The radio protocol architecture used for the first and second communication node devices in the user plane 350 is generally the same as the corresponding layers and sublayers in the control plane 300 for physical layer 351, PDCP sublayer 354 in L2 layer 355, RLC sublayer 353 in L2 layer 355, and MAC sublayer 352 in L2 layer 355, but the PDCP sublayer 354 also provides header compression for upper layer packets to reduce radio transmission overhead. The L2 355 in the user plane 350 also includes the SDAP (Service Data Adaptation Protocol) sublayer 356, which is responsible for mapping between QoS flows and Data Radio Bearer (DRB) to support a range of services. Although not shown, the first communication node device may have several upper layers above the L2 355, including a network layer (e.g., IP layer) terminating at the P-GW on the network side and an application layer terminating at the other end of the connection (e.g., remote UE, server).

As an embodiment, the wireless protocol architecture in FIG. 3 is applicable to the first node in this application.

As an embodiment, the wireless protocol architecture in FIG. 3 is applicable to the second node in this application.

As an embodiment, the first signal in this application is generated from RRC sublayer 306.

As an embodiment, the first signal in this application is generated from MAC sublayer 302.

As an embodiment, the first signal in this application is generated from MAC sublayer 352.

As an embodiment, the first signal in this application is generated from PHY301.

As an embodiment, the first signal in this application is generated from PHY351.

As an embodiment, the first bit block in this application is generated from RRC sublayer 306.

As an embodiment, the first bit block in this application is generated from MAC sublayer 302.

As an embodiment, the first bit block in this application is generated from MAC sublayer 352.

As an embodiment, the first bit block in this application is generated from PHY301.

As an embodiment, the first bit block in this application is generated from PHY351.

As an embodiment, the second bit block in this application is generated from RRC sublayer 306.

As an embodiment, the second bit block in this application is generated from MAC sublayer 302.

As an embodiment, the second bit block in this application is generated from MAC sublayer 352.

As an embodiment, the second bit block in this application is generated from PHY301.

As an embodiment, the second bit block in this application is generated from PHY351.

Embodiment 4

Figure 4:
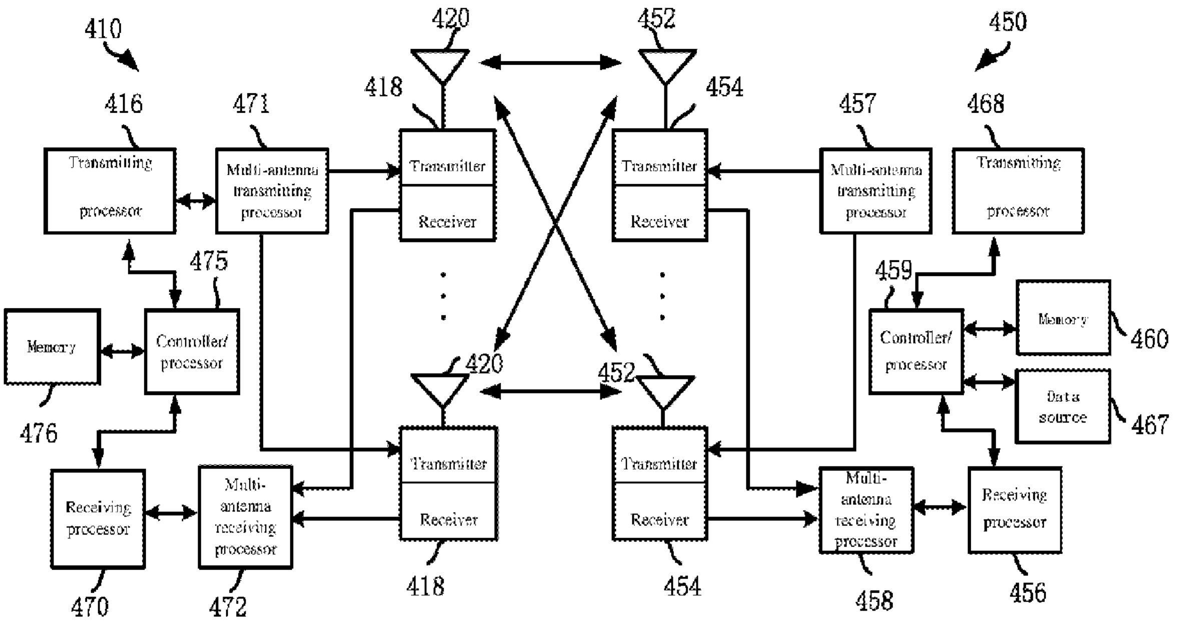
FIG. 4 shows a schematic diagram of a first communication device and a second communication device according to an embodiment of the application.

Embodiment 4 shows a schematic diagram of the first communication device and the second communication device according to an embodiment of this application, as shown in FIG. 4. FIG. 4 is a block diagram of the first communication device 410 and the second communication device 450 that communicate with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmission processor 468, a reception processor 456, a multi-antenna transmission processor 457, a multi-antenna reception processor 458, a transmitter/receiver 454 and an antenna 452.

During transmission from the first communication device 410 to the second communication device 450, upper layer data packets from the core network are provided to the controller/processor 475 at the first communication device 410. The controller/processor 475 implements L2 functionality. In the transmission from the first communication device 410 to the first communication device 450, the controller/processor 475 provides header compression, encryption, packet segmentation and reordering, multiplexing between logic and transport channels, and radio resource allocation based on various priority metrics to the second communication device 450. The controller/processor 475 is also responsible for re-transmitting lost packets and signals to the second communication device 450. The transmission processor 416 and the multi-antenna transmission processor 471 implement various signal processing functions for the L1 layer (i.e., the physical layer). The transmission processor 416 implements encoding and interleaving to facilitate forward error correction (FEC) at the second communication device 450, as well as mapping of signal clusters based on various modulation methods, such as binary phase shift keying (BPSK), orthogonal phase shift keying (QPSK), M phase shift keying (M-PSK), and M orthogonal amplitude modulation (M-QAM). The multi-antenna transmission processor 471 performs digital spatial precoding of encoded and modulated symbols, including codebook based precoding and non-codebook based precoding, as well as beam-forming processing to generate one or more space streams. The transmission processor 416 then maps each space stream to a subcarrier, multi-channel multiplexes them and/or reference signals (e.g., pilots) in the time and/or frequency domains, and then uses an Inverse Fast Fourier Transform (IFFT) to generate a physical channel that carries the time domain multi-carrier symbol stream. Subsequently, the multi-antenna transmission processor 471 performs transmission simulation and precoding/beam-forming operation on the time domain multi-carrier symbol stream. Each transmitter 418 converts the baseband multi-carrier symbol stream provided by the multi-antenna transmission processor 471 into radio frequency streams which are then provided to different antennas 420.

In transmission from the first communication device 410 to the second communication device 450, each receiver 454 receives signals through its corresponding antenna 452. Each receiver 454 restores the information modulated onto the radio frequency carrier and converts the radio frequency stream into a baseband multi-carrier symbol stream and provides it to the receiving processor 456. The receiving processor 456 and the multi-antenna receiving processor 458 perform various signal processing functions for the L1. The multi-antenna receiving processor 458 performs analog reception precoding/beam-forming operations on the baseband multi-carrier symbol stream from the receiver 454. The receiving processor 456 uses Fast Fourier Transform (FFT) to convert the baseband multi-carrier symbol stream from the time domain to the frequency domain after receiving the analog precoding/beam-forming operation. In the frequency domain, the physical layer data signal and the reference signal are demultiplexed by the receiving processor 456, where the reference signal is used for channel estimation, and the data signal is detected in the multi-antenna receiving processor 458 and restored to any space stream destined for the second communication device 450. The symbols on each space stream are demodulated and restored in the receiving processor 456, after which soft decisions are generated. Then the receiving processor 456 decodes and de-interleaves the soft decision to recover the upper layer data and control signals transmitted by the first communication device 410 on the physical channel. The upper layer data and control signals are then supplied to the controller/processor 459. The controller/processor 459 implements the L2 functions. The controller/processor 459 may be associated with the memory 460 that stores program code and data. The memory 460 may be referred to as a computer readable medium. In the transmission from the first communication device 410 to the second communication device 450, the controller/processor 459 provides multiplexing between transmission and logic channels, packet reassembly, decryption, header decompression and control signal processing to recover upper layer data packets from the core network. The upper layer packets are then provided to all protocol layers above L2. Various control signals can also be provided to L3 for processing.

During transmission from the second communication device 450 to the first communication device 410, a data source 467 is used at the second communication device 450 to provide upper layer data packets to the controller/processor 459. The data source 467 represents all protocol layers above L2. Similar to the transmission function described for the first communication device 410 in the transmission from the first communication device 410 to the second communication device 450, the controller/processor 459 implements header compression, encryption, packet segmentation and reordering, as well as multiplexing between logic and transport channels based on wireless resource allocation, implementing L2 layer functions for the user and control planes. The controller/processor 459 is also responsible for the retransmission of lost packets and signal to the first communication device 410. The transmission processor 468 performs modulation mapping and channel coding processing, and the multi-antenna transmission processor 457 performs spatial digital multi-antenna precoding, including codebook based precoding and non-codebook based precoding and beam-forming processing. Subsequently, the transmission processor 468 modulates the generated space stream into a multi-carrier/single carrier symbol stream.

In the transmission from the second communication device 450 to the first communication device 410, the function at the first communication device 410 is similar to the reception function at the second communication device 450 described in the transmission from the first communication device 410 to the second communication device 450. They undergo simulated precoding/beam-forming operations in the multi-antenna transmission processor 457 and are then supplied to different antennas 452 through the transmitter 454. Each transmitter 454 first converts the baseband symbol stream provided by the multi-antenna transmission processor 457 into a radio frequency symbol stream, and then provides them to antenna 452. Each receiver 418 receives RF signals through the corresponding antenna 420, converts the received RF signals into baseband signals, and provides the baseband signals to the multi-antenna receiving processor 472 and the receiving processor 470. The receiving processor 470 and the multi-antenna receiving processor 472 jointly implement the L1 functions. The controller/processor 475 implements L2 functionality. The controller/processor 475 may be associated with the memory 476 that stores program code and data. The memory 476 may be referred to as a computer readable medium. In the transmission from the second communication device 450 to the first communication device 410, the controller/processor 475 provides multi-channel multiplexing, packet reassembly, decryption, header decompression, and control signal processing between the transport and the logical channels to recover upper layer data packets from the UE450. Upper layer data packets from the controller/processor 475 can be provided to the core network.

As an embodiment, the first node in this application includes the second communication device 450, and the second node in this application includes the first communication device 410.

As a subsidiary embodiment of the above embodiment, the first node is a user device, and the second node is a user device.

As a subsidiary embodiment of the above embodiment, the first node is a user device, and the second node is a relay node.

As a subsidiary embodiment of the above embodiment, the first node is a relay node, and the second node is a user device.

As a subsidiary embodiment of the above embodiment, the first node is a user device, and the second node is a base station device.

As a subsidiary embodiment of the above embodiment, the first node is a relay node, and the second node is a base station device.

As a subsidiary embodiment of the above embodiment, the second node is a user device, and the first node is a base station device.

As a subsidiary embodiment of the above embodiment, the second node is a relay node, and the first node is a base station device.

As a subsidiary embodiment of the above embodiment, the second communication device 450 comprises at least one controller/processor. At least one controller/processor is responsible for HARQ operation.

As a subsidiary embodiment of the above embodiment, the first communication device 410 comprises at least one controller/processor. At least one controller/processor is responsible for HARQ operation.

As a subsidiary embodiment of the above embodiment, the first communication device 410 comprises at least one controller/processor. At least one controller/processor is responsible for error detection using positive acknowledgment (ACK) and/or negative acknowledgment (NACK) protocols to support HARQ operations.

As an embodiment, the second communication device 450 comprises at least one processor and at least one block of memory, which comprises computer program codes. The memory and the computer program codes are configured to be used with the processor. The second communication device 450 carries out at least the following actions: receiving a first signal; sending the first and second bit blocks in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As a subsidiary embodiment of the above embodiment, the second communication device 450 corresponds to the first node in this application.

As an embodiment, the second communication device 450 comprises a memory for storing a computer readable instruction program, wherein the computer readable instruction program generates an action when executed by at least one processor, and the actions include the following: receiving a first signal; sending the first and second bit blocks in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As a subsidiary embodiment of the above embodiment, the second communication device 450 corresponds to the first node in this application.

As an embodiment, the first communication device 410 comprises at least one processor and at least one block of memory, which comprises computer program codes. The memory and the computer program codes are configured to be used with the processor. The first communication device 410 carries out at least the following actions: sending a first signal; receiving the first and second bit blocks in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As a subsidiary embodiment of the above embodiment, the first communication device 410 corresponds to the second node in this application.

As an embodiment, the first communication device 410 comprises a memory for storing a computer readable instruction program, wherein the computer readable instruction program generates an action when executed by at least one processor, and the actions include the following: sending a first signal; receiving the first and second bit blocks in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As a subsidiary embodiment of the above embodiment, the first communication device 410 corresponds to the second node in this application.

As an embodiment, at least one of the antenna 452, receiver 454, multi-antenna receiving processor 458, receiving processor 456, controller/processor 459, memory 460, and data source 467 is used to receive the first signal in this application.

As an embodiment, at least one of the antenna 420, transmitter 418, multi-antenna transmission processor 471, transmission processor 416, controller/processor 475, and memory 476 is used to transmit the first signal in this application.

As an embodiment, at least one of the antenna 452, transmitter 454, multi-antenna transmission processor 458, transmission processor 468, controller/processor 459, memory 460, and data source 467 is used to transmit the first and second bit blocks in the first PUCCH of this application.

As an embodiment, at least one of the antenna 420, receiver 418, multi-antenna receiving processor 472, receiving processor 470, controller/processor 475, and memory 476 is used to receive the first and second bit blocks in the first PUCCH of this application.

As an embodiment, the second communication device 450 comprises at least one processor and at least one block of memory, which comprises computer program codes. The memory and the computer program codes are configured to be used with the processor. The second communication device 450 carries out at least the following actions: receiving a first signal; sending a first bit block and a second bit block in the first PUCCH, wherein the first bit block comprises at least one bit, and the second bit block comprises at least one bit; the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As a subsidiary embodiment of the above embodiment, the second communication device 450 corresponds to the first node in this application.

As an embodiment, the second communication device 450 comprises a memory for storing a computer readable instruction program, wherein the computer readable instruction program generates an action when executed by at least one processor, and the actions include the following: receiving a first signal; sending the first and second bit blocks in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool. The second value is linearly related to the number of bits included in the first bit block, and the second value is linearly related to the number of bits included in the second bit block. The first resource pool is one of N resource pools, and the third value is related to the second value. The size relationship between the third value and the M2 reference values is used to determine the first resource pool from the N resource pools.

The M2 reference values are different from each other, and M2 is a positive integer greater than 1. At least one of the M2 reference values is not an integer.

As a subsidiary embodiment of the above embodiment, the second communication device 450 corresponds to the first node in this application.

As an embodiment, the first communication device 410 comprises at least one processor and at least one block of memory, which comprises computer program codes. The memory and the computer program codes are configured to be used with the processor. The first communication device 410 carries out at least the following actions: sending a first signal; receiving a first bit block and a second bit block in the first PUCCH, wherein the first bit block comprises at least one bit, and the second bit block comprises at least one bit; the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As a subsidiary embodiment of the above embodiment, the first communication device 410 corresponds to the second node in this application.

As an embodiment, the first communication device 410 comprises a memory for storing a computer readable instruction program, wherein the computer readable instruction program generates an action when executed by at least one processor, and the actions include the following: sending a first signal; receiving the first and second bit blocks in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool. The second value is linearly related to the number of bits included in the first bit block, and the second value is linearly related to the number of bits included in the second bit block. The first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As a subsidiary embodiment of the above embodiment, the first communication device 410 corresponds to the second node in this application.

Embodiment 5

Figure 5:
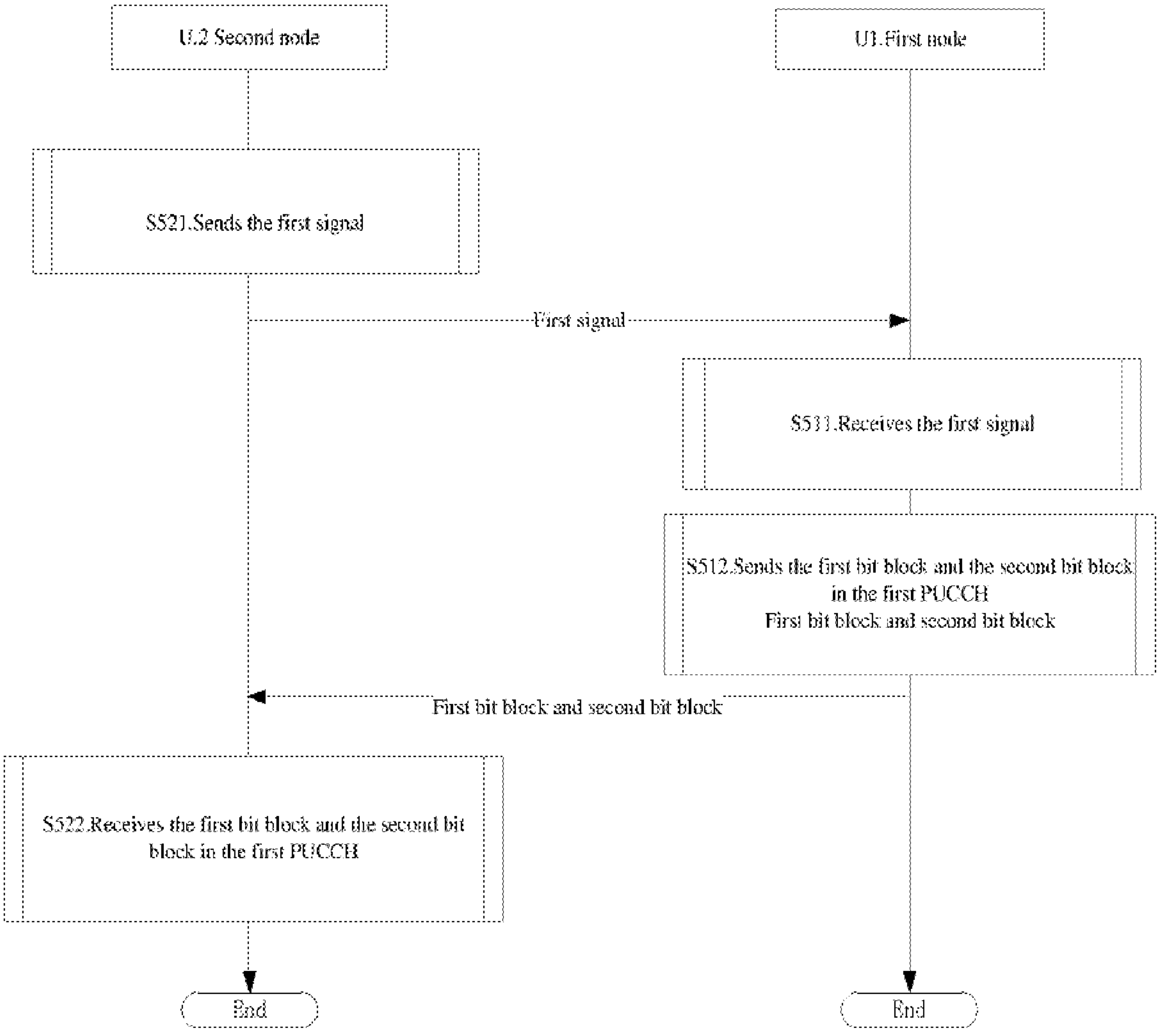
FIG. 5 shows a flow diagram for signal transmission according to an embodiment of this application.

Embodiment 5 shows a flowchart for signal transmission according to one embodiment of this application, as shown in FIG. 5. In FIG. 5, the first node U1 and the second node U2 communicate through an air interface.

The first node U1 receives the first signal in step S511. In step S512, the first and second bit blocks are sent in the first PUCCH.

The second node U2 sends the first signal in step S521. In step S522, the first and second bit blocks are received in the first PUCCH.

In Embodiment 5, the first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool. The second value is equal to the product of the sum of the number of bits included in the first bit block and the first weight value multiplied by the number of bits included in the second bit block. The first weight value is default, configurable, or rate dependent.

As a subsidiary embodiment of embodiment 5, the first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, and the fourth value is constant or configurable; and N is a positive integer greater than 1, and the first reference value is not less than 2. The size relationship between the third value and M2 reference values is used to determine the first resource pool from the N resource pools. The M2 reference values are different from each other, and M2 is a positive integer greater than 1.

As a subsidiary embodiment of Embodiment 5, the first resource pool is one of N resource pools. When the first value is not greater than the first reference value, the first resource pool is the default resource pool among the N resource pools. When the first value is greater than the first reference value, the second value is used to determine the first resource pool from the N resource pools. N is a positive integer greater than 1, and the first reference value is not less than 2. When the first value is greater than the first reference value, the size relationship between the second value and M1 reference values is used to determine the first resource pool from the N resource pools. The M1 reference values are different from each other, and the minimum value among the M1 reference values is greater than the first reference value, and M1 is a positive integer. When the first value is greater than the first reference value: regardless of whether the second value is greater than the first reference value, the first resource pool is a resource pool other than the default resource pool among the N resource pools.

As a subsidiary embodiment of embodiment 5, the second bit block is generated from the first HARQ-ACK codebook, and the number of bits included in the second bit block is not equal to the number of HARQ-ACK bits included in the first HARQ-ACK codebook.

As an embodiment, the first node U1 is the first node in the application.

As an embodiment, the second node U2 is the second node in the application.

As an embodiment, the first node U1 is a UE.

As an embodiment, the first node U1 is a base station.

As an embodiment, the second node U2 is a base station.

As an embodiment, the second node U2 is a UE.

As an embodiment, the air interface between the second node U2 and the first node U1 is a Uu interface.

As an embodiment, the air interface between the second node U2 and the first node U1 includes a cellular link.

As an embodiment, the air interface between the second node U2 and the first node U1 is a PC5 interface.

As an embodiment, the air interface between the second node U2 and the first node U1 includes a bylink.

As an embodiment, the air interface between the second node U2 and the first node U1 includes a wireless interface between the base station device and the user device.

As an embodiment, the air interface between the second node U2 and the first node U1 includes a wireless interface between user devices.

Embodiment 6

Figure 6:
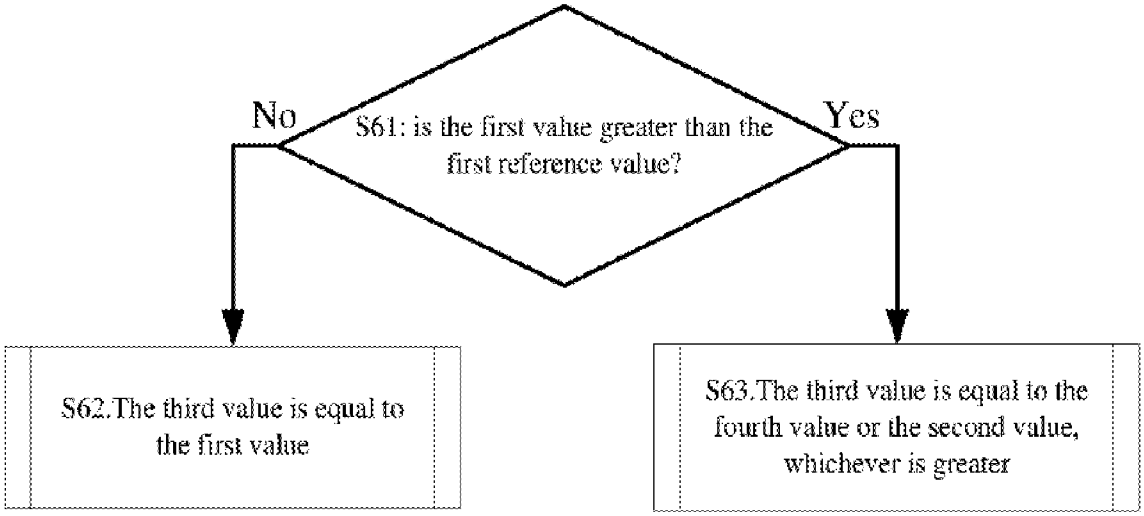
FIG. 6 shows a schematic diagram for the description of the third value according to an embodiment of the application.

Embodiment 6 illustrates a schematic diagram of a third value according to one embodiment of this application, as shown in FIG. 6. In FIG. 6: in S61, it determines whether the first value is greater than the first reference value; in S62, the third value is equal to the first value; and in S63, the third value is equal to the maximum of the fourth value and the second value.

In embodiment 6, the first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, and the fourth value is constant or configurable; N is a positive integer greater than 1, and the first reference value is not less than 2.

As an embodiment, one of the N resource pools includes multiple REs in the time-frequency domain.

As an embodiment, one of the N resource pools is configured by the higher layer signal.

As an embodiment, one of the N resource pools is configured by an RRC signal.

As an embodiment, one of the N resource pools is configured by PUCCH-ResourceSet.

As an embodiment, the number of resource sets included in one of the N resource pools is not greater than 8.

As an embodiment, the number of resource sets included in one of the N resource pools is not greater than 32.

As an embodiment, each of the N resource pools includes N sets of PUCCH resources.

As an embodiment, one of the N resource pools includes at least one resource set.

As an embodiment, one of the N resource pools includes at least one PUCCH resource.

As an embodiment, one of the N resource pools includes multiple PUCCH resources.

As an embodiment, N is equal to 2.

As an embodiment, N is greater than 2.

As an embodiment, N is equal to 3.

As an embodiment, N is equal to 4.

As an embodiment, N is not greater than 1024.

As an embodiment, the first reference value is a constant.

As an embodiment, the first reference value is a positive integer.

As an embodiment, the first reference value is equal to 2.

As an embodiment, the first reference value is greater than 2.

As an embodiment, the first reference value is equal to 2.5.

As an embodiment, the first reference value is equal to 3.

As an embodiment, the first reference value is equal to 4.

As an embodiment, the first reference value is a positive integer greater than 2.

As an embodiment, the first reference value is configured by a higher-level signal.

As an embodiment, the first reference value is configured by an RRC signal.

As an embodiment, the fourth value is equal to 3.

As an embodiment, the fourth value is greater than 2.

As an embodiment, the fourth value is not greater than 1706.

As an embodiment, the fourth value is configured by a higher-level signal.

As an embodiment, the fourth value is configured by an RRC signal.

As an embodiment, the third value is used to indicate the index of the first resource pool among the N resource pools.

As an embodiment, the expression in this application that the third value is used to determine the first resource pool from the N resource pools includes the following meaning: M2 reference values are different from each other, M2 is equal to 2, and the M2 reference values are K1 and K2 in descending order; when the third value is not greater than K1, the first resource pool is a resource pool with an identification number equal to 0 among the N resource pools; when the third value is greater than K1 and not greater than K2, the first resource pool is a resource pool with an identification number equal to 1 among the N resource pools.

As a subsidiary embodiment of the above embodiment, K1 is equal to 2.

As a subsidiary embodiment of the above embodiment, K1 is not an integer.

As a subsidiary embodiment of the above embodiment, K2 is equal to 1706.

As an embodiment, the expression in this application that the third value is used to determine the first resource pool from the N resource pools includes the following meaning M2 reference values are different from each other, M2 is equal to 3, and the M2 reference values are K1, K2, and K3 in descending order; when the third value is not greater than K1, the first resource pool is a resource pool with an identification number equal to 0 among the N resource pools; when the third value is greater than K1 and not greater than K2, the first resource pool is a resource pool with an identification number equal to 1 among the N resource pools; and when the third value is greater than K2 and not greater than K3, the first resource pool is a resource pool with an identification number equal to 2 among the N resource pools.

As a subsidiary embodiment of the above embodiment, K1 is equal to 2.

As a subsidiary embodiment of the above embodiment, K1 is not an integer.

As a subsidiary embodiment of the above embodiment, K1 is equal to 1706.

As an embodiment, the expression in this application that the third value is used to determine the first resource pool from the N resource pools includes the following meaning: M2 reference values are different from each other, M2 is equal to 4, and the M2 reference values are K1, K2, K3, and K4 in descending order; when the third value is not greater than K1, the first resource pool is a resource pool with an identification number equal to 0 among the N resource pools; when the third value is greater than K1 and not greater than K2, the first resource pool is a resource pool with an identification number equal to 1 among the N resource pools; when the third value is greater than K2 and not greater than K3, the first resource pool is a resource pool with an identification number equal to 2 among the N resource pools; and when the third value is greater than K3 and not greater than K4, the first resource pool is a resource pool with an identification number equal to 3 among the N resource pools.

As a subsidiary embodiment of the above embodiment, K1 is equal to 2.

As a subsidiary embodiment of the above embodiment, K1 is not an integer.

As a subsidiary embodiment of the above embodiment, K4 is equal to 1706.

As an embodiment, the expression in this application that the third value is used to determine the first resource pool from the N resource pools has the following meaning: the size relationship between the third value and M2 reference values is used to determine the first resource pool from the N resource pools. The M2 reference values are different from each other, and M2 is a positive integer greater than 1.

As an embodiment, M2 is equal to 2, and the M2 reference values are K1 and K2 in descending order; when the third value is not greater than K1, the first resource pool is a resource pool with an identification number equal to 0 among the N resource pools; when the third value is greater than K1 and not greater than K2, the first resource pool is a resource pool with an identification number equal to 1 among the N resource pools.

As a subsidiary embodiment of the above embodiment, K1 is equal to 2.

As a subsidiary embodiment of the above embodiment, K1 is not an integer.

As a subsidiary embodiment of the above embodiment, K2 is equal to 1706.

As an embodiment, M2 is equal to 3, and the M2 reference values are K1, K2, and K3 in descending order; when the third value is not greater than K1, the first resource pool is a resource pool with an identification number equal to 0 among the N resource pools; when the third value is greater than K1 and not greater than K2, the first resource pool is a resource pool with an identification number equal to 1 among the N resource pools; and when the third value is greater than K2 and not greater than K3, the first resource pool is a resource pool with an identification number equal to 2 among the N resource pools.

As a subsidiary embodiment of the above embodiment, K1 is equal to 2.

As a subsidiary embodiment of the above embodiment, K1 is not an integer.

As a subsidiary embodiment of the above embodiment, K1 is equal to 1706.

As an embodiment, M2 is equal to 4, and the M2 reference values are K1, K2, K3, and K4 in descending order; when the third value is not greater than K1, the first resource pool is a resource pool with an identification number equal to 0 among the N resource pools; when the third value is greater than K1 and not greater than K2, the first resource pool is a resource pool with an identification number equal to 1 among the N resource pools; when the third value is greater than K2 and not greater than K3, the first resource pool is a resource pool with an identification number equal to 2 among the N resource pools; and when the third value is greater than K3 and not greater than K4, the first resource pool is a resource pool with an identification number equal to 3 among the N resource pools.

As a subsidiary embodiment of the above embodiment, K1 is equal to 2.

As a subsidiary embodiment of the above embodiment, K1 is not an integer.

As a subsidiary embodiment of the above embodiment, K4 is equal to 1706.

As an embodiment, the identification number of one of the N resource pools is pucch-ResourceSetId.

As an embodiment, the identification number of one of the N resource pools is a sorting index.

As an embodiment, the identification number of one of the N resource pools is configured by RRC signal.

As an embodiment, M2 is equal to 2.

As an embodiment, M2 is equal to 3.

As an embodiment, M2 is equal to 4.

As an embodiment, one of the M2 reference values is configured by a higher-level signal.

As an embodiment, one of the M2 reference values is configured by an RRC signal.

As an embodiment, one of the M2 reference values is configured by an MAC CE signal.

As an embodiment, one of the M2 reference values is configured by a maxPayloadSize field.

As an embodiment, one of the M2 reference values is a constant.

As an embodiment, one of the M2 reference values is 2.

As an embodiment, the M2 reference values do not include 2.

As an embodiment, the first value is not greater than 1706, and the second value is not greater than 1706.

As an embodiment, the first reference value is one of the M2 reference values.

As an embodiment, the minimum value among the M2 reference values is the first reference value.

As an embodiment, the maximum value among the M2 reference values is 1706.

As an embodiment, the M2 reference values do not include the first reference value.

As an embodiment, the first value is not greater than the maximum value among the M2 reference values, the second value is not greater than the maximum value among the M2 reference values, and the fourth value is not greater than the maximum value among the M2 reference values.

As an embodiment, the pucch-ResourceSetId values of the N resource pools are equal to 0, 1, . . . , N−1.

Embodiment 7

Figure 7:
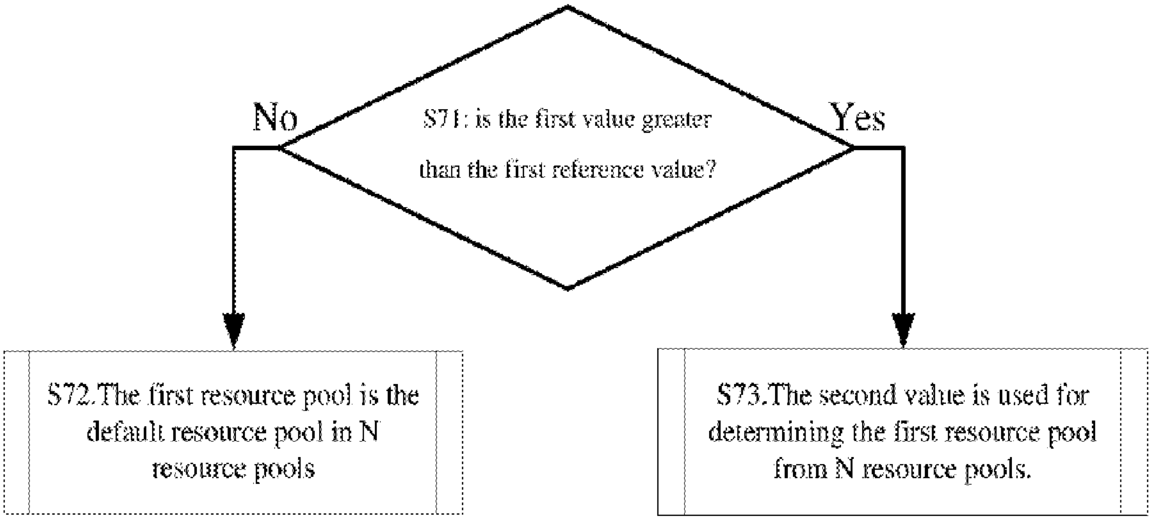
FIG. 7 shows an explanatory diagram of the first and second values used to determine the first resource pool according to an embodiment of this application.

Embodiment 7 shows an explanatory diagram of the first and second values used to determine the first resource pool according to an embodiment of this application, as shown in FIG. 7; With reference to FIG. 7: in S71, whether the first value is greater than the first reference value is determined; in S72, the first resource pool is the default resource pool among N resource pools; and in S73, the second value is used to determine the first resource pool from N resource pools.

In Embodiment 7, the first resource pool is one of N resource pools; when the first value is not greater than the first reference value, the first resource pool is the default resource pool among the N resource pools; when the first value is greater than the first reference value, the second value is used to determine the first resource pool from the N resource pools; N is a positive integer greater than 1, and the first reference value is not less than 2.

As an embodiment, one of the N resource pools includes multiple REs in the time-frequency domain.

As an embodiment, one of the N resource pools is configured by the higher layer signal.

As an embodiment, one of the N resource pools is configured by an RRC signal.

As an embodiment, one of the N resource pools is configured by PUCCH-ResourceSet.

As an embodiment, the number of resource sets included in one of the N resource pools is not greater than 8.

As an embodiment, the number of resource sets included in one of the N resource pools is not greater than 32.

As an embodiment, each of the N resource pools includes N sets of PUCCH resources.

As an embodiment, one of the N resource pools includes at least one resource set.

As an embodiment, one of the N resource pools includes at least one PUCCH resource.

As an embodiment, one of the N resource pools includes multiple PUCCH resources.

As an embodiment, the default resource pool is the first resource pool among the N resource pools.

As an embodiment, the default resource pool is the last resource pool among the N resource pools.

As an embodiment, the default resource pool is the resource pool corresponding to the smallest index among the N resource pools.

As an embodiment, the default resource pool is the resource pool corresponding to the largest index among the N resource pools.

As an embodiment, the default resource pool is one of N PUCCH resource sets, and the corresponding pucch-ResourceSetId of the default resource pool is equal to 0.

As an embodiment, the default resource pool is the resource pool with the smallest identification number among the N resource pools.

As an embodiment, the default resource pool is the resource pool with the largest identification number among the N resource pools.

As an embodiment, the default resource pool is a resource pool with an identification number equal to 0 among the N resource pools.

As an embodiment, the first reference value is a constant.

As an embodiment, the first reference value is equal to 2.

As an embodiment, the first reference value is greater than 2.

As an embodiment, the first reference value is equal to 2.5.

As an embodiment, the first reference value is equal to 3.

As an embodiment, the first reference value is equal to 4.

As an embodiment, the first reference value is a positive integer greater than 2.

As an embodiment, the first reference value is configured by a higher-level signal.

As an embodiment, the first reference value is configured by an RRC signal.

As an embodiment, when the first value is greater than the first reference value, the second value is used to indicate the first resource pool from the N resource pools.

As an embodiment, when the first value is greater than the first reference value, the second value is used to explicitly or implicitly indicate the index corresponding to the first resource pool.

As an embodiment, when the first value is greater than the first reference value, the second value is used to explicitly or implicitly indicate the pucch-ResourceSetId corresponding to the first resource pool.

As an embodiment, the expression in this application that the third value is used to determine the first resource pool from the N resource pools has the following meaning: the size relationship between the second value and M1 reference values is used to determine the first resource pool from the N resource pools. The M1 reference values are different from each other, and M1 is a positive integer.

As an embodiment, the expression in this application that the third value is used to determine the first resource pool from the N resource pools has the following meaning: the size relationship between the second value and M1 reference values is used to determine the first resource pool from the N resource pools. The M1 reference values are different from each other, the minimum value among the M1 reference values is greater than the first reference value, and M1 is a positive integer.

As an embodiment, N is equal to 2.

As an embodiment, N is greater than 2.

As an embodiment, N is equal to 3.

As an embodiment, N is equal to 4.

As an embodiment, N is not greater than 1024.

Embodiment 8

Embodiment 8 shows a schematic diagram of the size relationship between the second value and M1 reference values, as well as the relationship between the first resource pools, according to an embodiment of this application, as shown in FIG. 8;

In Embodiment 8, the first value in this application is greater than the first reference value. The size relationship between the second value and M1 reference values in this application is used to determine the first resource pool from the N resource pools available. The M1 reference values are different from each other, the minimum value among the M1 reference values is greater than the first reference value, and M1 is a positive integer.

As an embodiment, M1 is equal to 1.

As an embodiment, M1 is equal to 2.

As an embodiment, M1 is equal to 3.

As an embodiment, M1 is equal to 4.

As an embodiment, M1 is not greater than 64.

As an embodiment, one of the M1 reference values is configured by a higher-level signal.

As an embodiment, one of the M1 reference values is configured by an RRC signal.

As an embodiment, one of the M1 reference values is configured by an MAC CE signal.

As an embodiment, one of the M1 reference values is configured by a maxPayloadSize field.

As an embodiment, one of the M1 reference values is a constant.

As an embodiment, the first value is not greater than 1706, and the second value is not greater than 1706.

As an embodiment, the M1 reference values do not include the first reference value.

As an embodiment, the first value is not greater than the maximum value among the M1 reference values, and the second value is not greater than the maximum value among the M1 reference values.

As an embodiment, the minimum value among the M1 reference values is greater than 2.

As an embodiment, the expression in this application that the size relationship between the second value and M1 reference values is used to determine the first resource pool from the N resource pools includes the following meaning: M1 is equal to 1, and the M1 reference values are T1. When the second value is not greater than T1, the first resource pool is a resource pool with an identification number equal to 1 among the N resource pools. When the second value is greater than T1, the first resource pool is a resource pool with an identification number equal to 2 among the N resource pools.

As a subsidiary embodiment of the above embodiment, T1 is greater than the first reference value.

As an embodiment, the expression in this application that the size relationship between the second value and M1 reference values is used to determine the first resource pool from the N resource pools includes the following meaning: M1 is equal to 2, and the M1 reference values are T1 and T2 in descending order. When the second value is not greater than T1, the first resource pool is a resource pool with an identification number equal to 1 among the N resource pools. When the second value is greater than T1 and not greater than T2, the first resource pool is a resource pool with an identification number equal to 2 among the N resource pools.

As a subsidiary embodiment of the above embodiment, T1 is greater than the first reference value, and T2 is equal to 1706.

As an embodiment, the expression in this application that the size relationship between the second value and the M1 reference values is used to determine the first resource pool from the N resource pools includes the following meaning: M1 is equal to 3, and the M1 reference values are T1, T2, T3 in descending order. When the second value is not greater than T1, the first resource pool is a resource pool with an identification number equal to 1 among the N resource pools. When the second value is greater than T1 and not greater than T2, the first resource pool is a resource pool with an identification number equal to 2 among the N resource pools. When the second value is greater than T2 and not greater than T3, the first resource pool is a resource pool with an identification number equal to 3 among the N resource pools.

As a subsidiary embodiment of the above embodiment, T1 is greater than the first reference value, and the T3 is equal to 1706.

Embodiment 9

Embodiment 9 illustrates an explanatory diagram of the second numerical value according to one embodiment of this application, as shown in FIG. 9.

In Embodiment 9, the second value is equal to the product of the sum of the number of bits included in the first bit block and the first weight value and the number of bits included in the second bit block. The first weight value is default, configurable, or rate dependent.

As an embodiment, the first weight value is default.

As an embodiment, the first weight value is configured by a higher-level signal.

As an embodiment, the first weight value is configured by an RRC signal.

As an embodiment, the first weight value is configured by an MAC CE signal.

As an embodiment, the first weight value is a numerical value between 0 and 1.

As an embodiment, the first weight value is a numerical value greater than 1.

As an embodiment, the first weight value is configured in PUCCH-Config.

As an embodiment, the first weight value is indicated by the first signal.

As an embodiment, the first bit block and the second bit block correspond to a first code rate and a second code rate, respectively, and the first code rate is different from the second code rate.

As an embodiment, the first bit rate is lower than the second bit rate.

As an embodiment, the first bit rate is higher than the second bit rate.

As an embodiment, both the first and second bit rates are configured by RRC signal.

As an embodiment, the first and second bit rates are configured in the same PUCCH-Config.

As an embodiment, the first code rate and the second code rate are respectively configured in different PUCCH-Configs.

As an embodiment, the first bit rate and the second bit rate are respectively configured for different priorities.

As an embodiment, the first bit rate and the second bit rate are respectively configured for different priority indexes.

As an embodiment, the first bit rate and the second bit rate are the maximum bit rates configured by RRC signaling for the same PUCCH for different priorities.

As an embodiment, the first and second bit rates are respectively the maximum bit rates configured by RRC signaling for two different PUCCHs.

As an embodiment, the first bit rate is the bit rate used for the first bit block.

As an embodiment, the second bit rate is the bit rate used for the second bit block.

As an embodiment, the first bit rate is the maximum bit rate used for the first bit block.

As an embodiment, the second bit rate is the maximum bit rate used for the second bit block.

As an embodiment, the first weight value is equal to the ratio of the first bit rate to the second bit rate.

As an embodiment, the first weight value is equal to the ratio of the second bit rate to the first bit rate.

As an embodiment, the first weight value is the ratio of the first bit rate to the second bit rate.

As an embodiment, the first weight value is equal to the ratio of the second bit rate to the first bit rate.

As an embodiment, the first weight value is equal to the ratio of 1 to the first bit rate.

As an embodiment, the first weight value is equal to the ratio of 1 to the second bit rate.

Embodiment 10

Embodiment 10 illustrates a schematic diagram of the relationship between the second bit block and the first HARQ-ACK codebook according to one embodiment of this application, as shown in FIG. 10.

In Embodiment 10, the second bit block is generated from the first HARQ-ACK codebook, and the number of bits included in the second bit block is not equal to the number of HARQ-ACK bits included in the first HARQ-ACK codebook.

As an embodiment, the first HARQ-ACK codebook includes a positive integer of HARQ-ACK bits.

As an embodiment, the first HARQ-ACK codebook is a HARQ-ACK codebook corresponding to priority index 0.

As an embodiment, the first HARQ-ACK codebook is a HARQ-ACK codebook associated with a PUCCH with priority index 0.

As an embodiment, the first HARQ-ACK codebook is a Type-1 HARQ-ACK codebook.

As an embodiment, the first HARQ-ACK codebook is a Type-2 HARQ-ACK codebook.

As an embodiment, the number of bits included in the second bit block is greater than the number of HARQ-ACK bits included in the first HARQ-ACK codebook, while the second bit block includes the first HARQ-ACK codebook and at least one filling bit.

As an embodiment, the filling bit is a bit indicating a NACK.

As an embodiment, the filling bit is a bit indicating an ACK.

As an embodiment, the value of the filling bit is equal to 0.

As an embodiment, the value of the filling bit is equal to 1.

As an embodiment, the number of bits included in the second bit block is less than the number of HARQ-ACK bits included in the first HARQ-ACK codebook, while the second bit block includes at least some bits obtained by the bits in the first HARQ-ACK codebook after undergoing at least one of logical AND, logical OR, or XOR operation.

As an embodiment, the number of bits included in the second bit block is less than the number of HARQ-ACK bits included in the first HARQ-ACK codebook, and the second bit block includes only a portion of the HARQ-ACK bits in the first HARQ-ACK codebook.

As an embodiment, when the number of HARQ-ACK bits included in the first HARQ-ACK codebook is greater than the fifth value, the number of bits included in the second bit block is equal to the fifth value. The fifth value is a constant or configured by an RRC signal, indicated by MAC CE signal, or indicated by DCI.

As an embodiment, when the number of HARQ-ACK bits included in the first HARQ-ACK codebook is less than the fifth value, the number of bits included in the second bit block is equal to the fifth value. The fifth value is a constant or configured by RRC signal, indicated by MAC CE signal, or indicated by DCI.

As an embodiment, the number of bits included in the second bit block is always equal to the fifth value. The fifth value is a constant or configured by an RRC signal, indicated by MAC CE signal, or indicated by DCI.

As an embodiment, the fifth value is equal to 1.

As an embodiment, the fifth value is equal to 2.

As an embodiment, the fifth value is equal to 3.

As an embodiment, the fifth value is equal to 4.

As an embodiment, the fifth value is not greater than 1706.

As an embodiment, the fifth value is indicated by a DCI or MAC CE signal from multiple values configured by RRC signal.

As an embodiment, the number of bits included in the second bit block is equal to a constant.

As an embodiment, the number of bits included in the second bit block is equal to a numerical value configured by RRC signal.

As an embodiment, the number of bits included in the second bit block is equal to a numerical value indicated by an MAC CE signal.

As an embodiment, the number of bits included in the second bit block is equal to a numerical value indicated by DCI.

As an embodiment, the number of bits included in the second bit block is equal to a numerical value indicated by the first signal.

As an embodiment, the first bit block includes a HARQ-ACK codebook.

As an embodiment, the first bit block is a HARQ-ACK codebook.

As an embodiment, the first bit block is a HARQ-ACK codebook corresponding to priority index 1.

As an embodiment, the first bit block is a HARQ-ACK codebook associated with PUCCH, with priority index 1.

As an embodiment, the first bit block is generated from the second HARQ-ACK codebook, and the number of bits included in the first bit block is not equal to the number of HARQ-ACK bits included in the second HARQ-ACK codebook.

As an embodiment, the second HARQ-ACK codebook includes a positive integer of HARQ-ACK bits.

As an embodiment, the second HARQ-ACK codebook is a HARQ-ACK codebook corresponding to priority index 1.

As an embodiment, the second HARQ-ACK codebook is a HARQ-ACK codebook associated with PUCCH with priority index 1.

As an embodiment, the second HARQ-ACK codebook is a Type-1 HARQ-ACK codebook.

As an embodiment, the second HARQ-ACK codebook is a Type-2 HARQ-ACK codebook.

As an embodiment, the number of bits included in the first bit block is greater than the number of HARQ-ACK bits included in the second HARQ-ACK codebook, while the first bit block includes the second HARQ-ACK codebook and at least one filling bit.

As an embodiment, the number of bits included in the first bit block is less than the number of HARQ-ACK bits included in the second HARQ-ACK codebook, and the first bit block includes at least some bits obtained by the bits in the second HARQ-ACK codebook after undergoing at least one of logical AND, logical OR, or XOR operation.

As an embodiment, the number of bits included in the first bit block is less than the number of HARQ-ACK bits included in the second HARQ-ACK codebook, and the first bit block includes only a portion of the HARQ-ACK bits in the second HARQ-ACK codebook.

As an embodiment, the number of bits included in the second bit block is equal to the number of first bits. The number of first bits is one of the number of Q bits, and the numbers of Q bits are different from each other. Any bits within the number of Q bits is a non-negative integer, and Q is a positive integer greater than 1.

As a subsidiary embodiment of the above embodiment, the first signal is used to indicate the number of first bits from the number of Q bits.

As a subsidiary embodiment of the above embodiment, the number of Q bits is configured by higher-level signal.

As a subsidiary embodiment of the above embodiment, the number of Q bits is configured by an RRC signal.

As a subsidiary embodiment of the above embodiment, the number of Q bits is predefined.

As a subsidiary embodiment of the above embodiment, one of the Q bit numbers is configured by higher-level signal.

As a subsidiary embodiment of the above embodiment, one of the Q bit numbers is configured by RRC signal.

As a subsidiary embodiment of the above embodiment, one of the Q bit numbers is predefined.

As a subsidiary embodiment of the above embodiment, one of the Q bit numbers is 0.

As a subembodiment of the above embodiment, one of the Q bit numbers is 1.

As a subsidiary embodiment of the above embodiment, one of the Q bit numbers is 2.

As a subsidiary embodiment of the above embodiment, one of the Q bit numbers is 4.

As a subsidiary embodiment of the above embodiment, Q is equal to 2.

As a subsidiary embodiment of the above embodiment, Q is equal to 4.

As a subsidiary embodiment of the above embodiment, Q is equal to 8.

As a subsidiary embodiment of the above embodiment, Q is not greater than 1024.

As a subsidiary embodiment of the above embodiment, an RRC signal received by the first node is used to indicate the number of first bits from the number of Q bits.

As a subsidiary embodiment of the above embodiment, an IE with a name including PUCCH is used to indicate the number of first bits from the number of Q bits.

As a subsidiary embodiment of the above embodiment, an IE with a name including PUCCH-Config is used to indicate the number of first bits from the number of Q bits.

As a subsidiary embodiment of the above embodiment, an MAC CE signal received by the first node is used to indicate the number of first bits from the number of Q bits.

As an embodiment, the first HARQ-ACK codebook is used to determine the second bit block, which includes at least one HARQ-ACK bit. The number of HARQ-ACK bits included in the first HARQ-ACK codebook is not equal to the number of bits included in the second bit block.

As a subsidiary embodiment of the above embodiment, the number of HARQ-ACK bits included in the first HARQ-ACK codebook is greater than the number of bits included in the second bit block, and the first HARQ-ACK codebook is compressed to generate the second bit block.

As a subsidiary embodiment of the above embodiment, the number of HARQ-ACK bits included in the first HARQ-ACK codebook is less than the number of bits included in the second bit block, and the first HARQ-ACK codebook is filled to generate the second bit block.

As an embodiment, the first HARQ-ACK codebook is used to determine the second bit block, and the first HARQ-ACK codebook includes at least one HARQ-ACK bit. The number of bits included in the second bit block is equal to the number of first bits. The number of first bits is one of the Q bit numbers, and the numbers of Q bits are different from each other. Any bit number in the Q bit number is a non-negative integer, and Q is a positive integer greater than 1. The number of HARQ-ACK bits included in the first HARQ-ACK codebook is not equal to the number of first bits.

As a subsidiary embodiment of the above embodiment, the first signal is used to indicate the number of first bits from the number of Q bits.

As a subsidiary embodiment of the above embodiment, the number of Q bits is configured by higher-level signal.

As a subsidiary embodiment of the above embodiment, the number of Q bits is configured by an RRC signal.

As a subsidiary embodiment of the above embodiment, the number of Q bits is predefined.

As a subsidiary embodiment of the above embodiment, one of the Q bit numbers is configured by higher-level signal.

As a subsidiary embodiment of the above embodiment, one of the Q bit numbers is configured by RRC signal.

As a subsidiary embodiment of the above embodiment, one of the Q bit numbers is predefined.

As a subsidiary embodiment of the above embodiment, one of the Q bit numbers is 0.

As a subembodiment of the above embodiment, one of the Q bit numbers is 1.

As a subsidiary embodiment of the above embodiment, one of the Q bit numbers is 2.

As a subsidiary embodiment of the above embodiment, one of the Q bit numbers is 4.

As a subsidiary embodiment of the above embodiment, Q is equal to 2.

As a subsidiary embodiment of the above embodiment, Q is equal to 4.

As a subsidiary embodiment of the above embodiment, Q is equal to 8.

As a subsidiary embodiment of the above embodiment, Q is not greater than 1024.

As a subsidiary embodiment of the above embodiment, an RRC signal received by the first node is used to indicate the number of first bits from the number of Q bits.

As a subsidiary embodiment of the above embodiment, an IE with a name including PUCCH is used to indicate the number of first bits from the number of Q bits.

As a subsidiary embodiment of the above embodiment, an IE with a name including PUCCH-Config is used to indicate the number of first bits from the number of Q bits.

As a subsidiary embodiment of the above embodiment, an MAC CE signal received by the first node is used to indicate the number of first bits from the number of Q bits.

As a subsidiary embodiment of the above embodiment, the number of HARQ-ACK bits included in the first HARQ-ACK codebook is different from any one of the Q bit numbers. The number of HARQ-ACK bits included in the first HARQ-ACK codebook is used to determine the number of first bits from the number of Q bits.

As a subsidiary embodiment of the above embodiment, the number of HARQ-ACK bits included in the first HARQ-ACK codebook is greater than the number of first bits, and the first HARQ-ACK codebook is compressed to generate the second bit block.

As a subsidiary embodiment of the above embodiment, the number of HARQ-ACK bits included in the first HARQ-ACK codebook is less than the number of first bits, and the first HARQ-ACK codebook is filled to generate the second bit block.

As an embodiment, the expression that the number of HARQ-ACK bits included in the first HARQ-ACK codebook is used to determine the number of first bits from the Q bits includes the following meaning: the absolute value of the difference between the number of the first bits and the number of HARQ-ACK bits included in the first HARQ-ACK codebook is not greater than the absolute value of the difference between any number of bits other than the number of the first bits in the Q bits and the number of HARQ-ACK bits included in the first HARQ-ACK codebook.

As an embodiment, the expression that the number of HARQ-ACK bits included in the first HARQ-ACK codebook is used to determine the number of first bits from the Q bits includes the following meaning: among the Q bits, the number of first bits is the maximum value of the number of HARQ-ACK bits included in the first HARQ-ACK codebook.

As an embodiment, the expression that the number of HARQ-ACK bits included in the first HARQ-ACK codebook is used to determine the number of first bits from the Q bits includes the following meaning: among the Q bits, the number of first bits is the minimum value of the number of HARQ-ACK bits included in the first HARQ-ACK codebook.

As an embodiment, the expression that the first HARQ-ACK codebook is compressed to generate the second bit block includes the following meaning: at least one bit in the second bit block is the result of multiple HARQ-ACK bits in the first HARQ-ACK codebook being subjected to at least one of the logical AND, logical OR, or XOR operations.

As an embodiment, the expression that the first HARQ-ACK codebook is compressed to generate the second bit block includes the following meaning: any bit in the second bit block is a HARQ-ACK bit in the first HARQ-ACK codebook or a result obtained by at least one of the HARQ- ACK bits in the first HARQ-ACK codebook after logical AND, logical OR, or XOR operations.

As an embodiment, the expression that the first HARQ-ACK codebook is filled to generate the second bit block includes the following meaning: the second bit block includes all HARQ-ACK bits in the first HARQ-ACK codebook and at least one filling bit representing ACK or NACK.

Embodiment 11

Embodiment 11 illustrates an explanatory diagram of the first and second bit blocks according to one embodiment of this application, as shown in FIG. 11.

In Embodiment 11, the first bit block and the second bit block in this application respectively include HARQ-ACK bits corresponding to different priority indexes.

As an embodiment, the HARQ-ACK bits in the first bit block correspond to a priority index 1, and the HARQ-ACK bits in the second bit block correspond to a priority index 0.

As an embodiment, the HARQ-ACK bits in the first bit block correspond to priority index 0, and the HARQ-ACK bits in the second bit block correspond to priority index 1.

As an embodiment, the priority index corresponding to a HARQ-ACK bit is the HARQ-ACK codebook to which the HARQ-ACK bit belongs or the priority index of the PUCCH associated with the HARQ-ACK codebook used to generate the HARQ-ACK bit.

As an embodiment, the HARQ-ACK bits in the first bit block are all associated with the PUCCH HARQ-ACK with priority index 1, and the HARQ-ACK bits in the second bit block are all associated with the PUCCH HARQ-ACK bits with priority index 0.

As an embodiment, the HARQ-ACK bits in the first bit block are all associated with PUCCH HARQ-ACK bits with priority index 0, and the HARQ-ACK bits in the second bit block are all associated with PUCCH HARQ-ACK bits with priority index 1.

As an embodiment, the first bit block and the second bit block correspond to different physical layer priorities, respectively.

As an embodiment, the first bit block and the second bit block correspond to different types, respectively.

As an embodiment, the first bit block and the second bit block respectively include HARQ-ACK bits for unicast and HARQ-ACK bits for MBS (Multicast and Broadcast Services).

As an embodiment, the second bit block and the first bit block respectively include HARQ-ACK bits for unicast and HARQ-ACK bits for MBS (Multicast and Broadcast Services).

As an embodiment, the first bit block and the second bit block respectively include bits corresponding to different QoS (Quality of Service).

Embodiment 12

Figure 12:
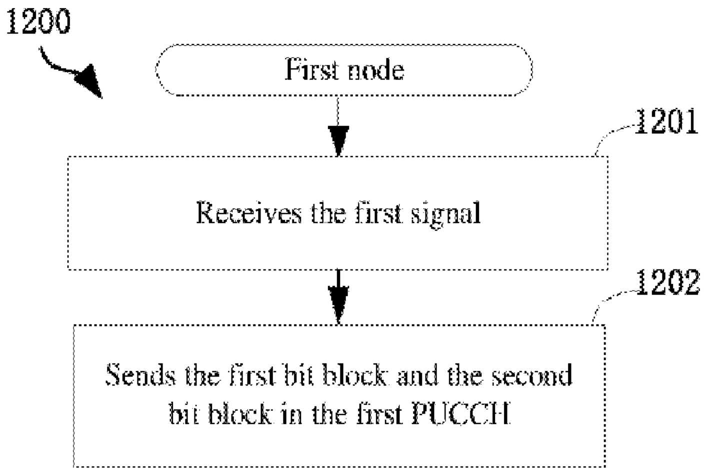
FIG. 12 shows a process flow diagram for the first node of an embodiment according to the application.

Embodiment 12 shows a process flow diagram for the first node of an embodiment according to the application, as shown in FIG. 12.

In Embodiment 12, the first node in this application receives the first signal in step 1201. In step 1202, the first and second bit blocks are sent in the first PUCCH.

In Embodiment 12, the first bit block comprises at least one bit, and the second bit block comprises at least one bit; the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As an embodiment, the third value is the second value.

As an embodiment, the third value is equal to the second value plus 1.

As an embodiment, the third value is equal to twice the second value.

As an embodiment, the M2 reference values are all positive.

As an embodiment, the minimum value among the M2 reference values is not an integer.

As an embodiment, one of the M2 reference values is equal to 1 plus the ratio of the first bit rate in this application to the second bit rate in this application.

As an embodiment, the minimum value of the M2 reference values is equal to 1 plus the ratio of the first bit rate in this application to the second bit rate in this application.

As an embodiment, one of the M2 reference values is equal to 1 plus the first weight value. The first weight value is default, configurable, or rate dependent.

As an embodiment, the minimum value among the M2 reference values is equal to 1 plus the first weight value. The first weight value is default, configurable, or rate dependent.

As an embodiment, the minimum value of the M2 reference values is greater than 1 and less than 2.

As an embodiment, the first node in this application receives the first signal and sends the first bit block and the second bit block in the first PUCCH. The second node in this application sends the first signal and receives the first and second bit blocks in the first PUCCH. The first bit block comprises at least one bit, and the second bit block comprises at least one bit; the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As a subsidiary embodiment of the above embodiment, one of the M2 reference values is greater than 1 and less than 2.

As a subsidiary embodiment of the above embodiment, one of the M2 reference values is equal to 1 plus the first weight value. The first weight value is default, configurable, or rate dependent.

As a subsidiary embodiment of the above embodiment, the third value is the second value. The second value is equal to the product of the sum of the number of bits included in the first bit block and the first weight value multiplied by the number of bits included in the second bit block. The first weight value is default, configurable, or rate dependent.

As a subsidiary embodiment of the above embodiment, the second bit block is generated from the first HARQ-ACK codebook, and the number of bits included in the second bit block is not equal to the number of HARQ-ACK bits included in the first HARQ-ACK codebook.

Embodiment 13

Figure 13:
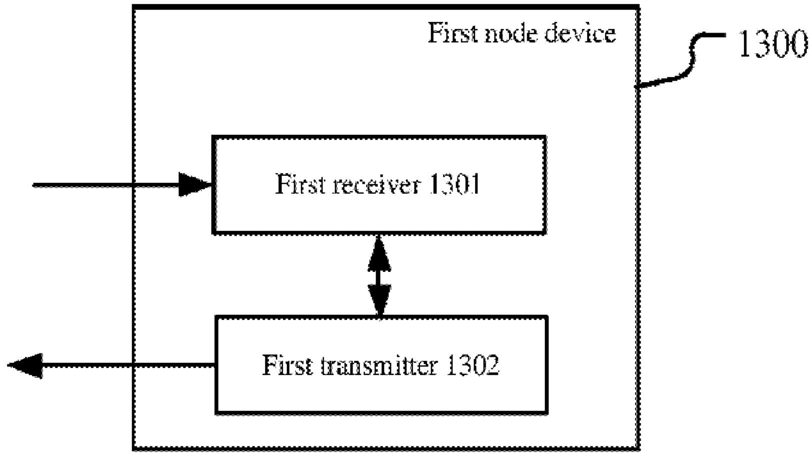
FIG. 13 shows a structural block diagram of a processing device in a first node device according to an embodiment of this application.

Embodiment 13 illustrates a structural block diagram of a processing device in the first node device of one embodiment, as shown in FIG. 13. In FIG. 13, the processing device of the first node device 1300 comprises a first receiver 1301 and a first transmitter 1302.

As an embodiment, the first node device 1300 is a user device.

As an embodiment, the first node device 1300 is a relay node.

As an embodiment, the first node device 1300 is an onboard communication device.

As an embodiment, the first node device 1300 is a user device that supports V2X communication.

As an embodiment, the first node device 1300 is a relay node that supports V2X communication.

As an embodiment, the first receiver 1301 includes at least one of the antennas 452, receiver 454, multi-antenna receiving processor 458, receiving processor 456, controller/processor 459, memory 460, and data source 467 in FIG. 4 of this application.

As an embodiment, the first receiver 1301 comprises at least the first five of the antennas 452, receiver 454, multi-antenna receiving processor 458, receiving processor 456, controller/processor 459, memory 460, and data source 467 in FIG. 4 of this application.

As an embodiment, the first receiver 1301 comprises at least the first four of the antennas 452, receiver 454, multi-antenna receiving processor 458, receiving processor 456, controller/processor 459, memory 460, and data source 467 in FIG. 4 of this application.

As an embodiment, the first receiver 1301 comprises at least the first three of the antennas 452, receiver 454, multi-antenna receiving processor 458, receiving processor 456, controller/processor 459, memory 460, and data source 467 in FIG. 4 of this application.

As an embodiment, the first receiver 1301 comprises at least the first two of the antennas 452, receiver 454, multi-antenna receiving processor 458, receiving processor 456, controller/processor 459, memory 460, and data source 467 in FIG. 4 of this application.

As an embodiment, the first transmitter 1302 comprises at least one of the antennas 452, transmitter 454, multi-antenna transmitter processor 457, transmission processor 468, controller/processor 459, memory 460 and data source 467 in FIG. 4 of this application.

As an embodiment, the first transmitter 1302 comprises at least the first five of the antennas 452, transmitter 454, multi-antenna transmitter processor 457, transmission processor 468, controller/processor 459, memory 460 and data source 467 in FIG. 4 of this application.

As an embodiment, the first transmitter 1302 comprises at least the first four of the antennas 452, transmitter 454, multi-antenna transmitter processor 457, transmission processor 468, controller/processor 459, memory 460 and data source 467 in FIG. 4 of this application.

As an embodiment, the first transmitter 1302 comprises at least the first three of the antennas 452, transmitter 454, multi-antenna transmitter processor 457, transmission processor 468, controller/processor 459, memory 460 and data source 467 in FIG. 4 of this application.

As an embodiment, the first transmitter 1302 comprises at least the first two of the antennas 452, transmitter 454, multi-antenna transmitter processor 457, transmission processor 468, controller/processor 459, memory 460 and data source 467 in FIG. 4 of this application.

As an embodiment, the first receiver 1301 receives a first signal. The first transmitter 1302 sends the first bit block and the second bit block in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As an embodiment, the first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, and the fourth value is constant or configurable; N is a positive integer greater than 1, and the first reference value is not less than 2.

As an embodiment, the size relationship between the third value and the M2 reference values is used to determine the first resource pool from the N resource pools. The M2 reference values are different from each other, and M2 is a positive integer greater than 1.

As an embodiment, the first resource pool is one of N resource pools; when the first value is not greater than the first reference value, the first resource pool is the default resource pool among the N resource pools; when the first value is greater than the first reference value, the second value is used to determine the first resource pool from the N resource pools; N is a positive integer greater than 1, and the first reference value is not less than 2.

As an embodiment, when the first value is greater than the first reference value, the size relationship between the second value and the M1 reference values is used to determine the first resource pool from the N resource pools; the M1 reference values are different from each other, the minimum value among the M1 reference values is greater than the first reference value, and M1 is a positive integer.

As an embodiment, when the first value is greater than the first reference value: regardless of whether the second value is greater than the first reference value, the first resource pool is a resource pool other than the default resource pool among the N resource pools.

As an embodiment, the second value is equal to the product of the sum of the number of bits included in the first bit block and the first weight value and the number of bits included in the second bit block. The first weight value is default, configurable, or rate dependent.

As an embodiment, the second bit block is generated from the first HARQ-ACK codebook, and the number of bits included in the second bit block is not equal to the number of HARQ-ACK bits included in the first HARQ-ACK codebook.

As an embodiment, the first receiver 1301 receives the first signal. The first transmitter 1302 sends the first bit block and the second bit block in the first PUCCH. The first bit block and the second bit block respectively include HARQ-ACK bits corresponding to different priority indices. Among them, the resources occupied by the first PUCCH belong to the first resource set, the first resource set belongs to the first resource pool, the first resource pool includes multiple resource sets, and the first signal is used to determine the first resource set from the first resource pool. The first value is equal to the sum of the number of bits included in the first bit block and the number of bits included in the second bit block, and the second value is equal to the product of the sum of the number of bits included in the first bit block and the first weight value multiplied by the number of bits included in the second bit block. The first weight value is default, configurable, or rate dependent. The second value and the first value are not equal. The first and second values are both used to determine the first resource pool.

As a subsidiary embodiment of the above embodiment, the first weight value is configured by RRC signal.

As a subsidiary embodiment of the above embodiment, the first bit block and the second bit block correspond to the first code rate and the second code rate, respectively. The first code rate is different from the second code rate, and the first weight value is equal to the ratio of the first code rate to the second code rate.

As an embodiment, the first receiver 1301 receives the first signal. The first transmitter 1302 sends the first bit block and the second bit block in the first PUCCH. The first bit block comprises at least one bit, and the second bit block comprises at least one bit; the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As a subsidiary embodiment, one of the M2 reference values is greater than 1 and less than 2.

As an embodiment, one of the M2 reference values is equal to 1 plus the first weight value. The first weight value is default, configurable, or rate dependent.

As an embodiment, the third value is the second value.

Embodiment 14

Figure 14:
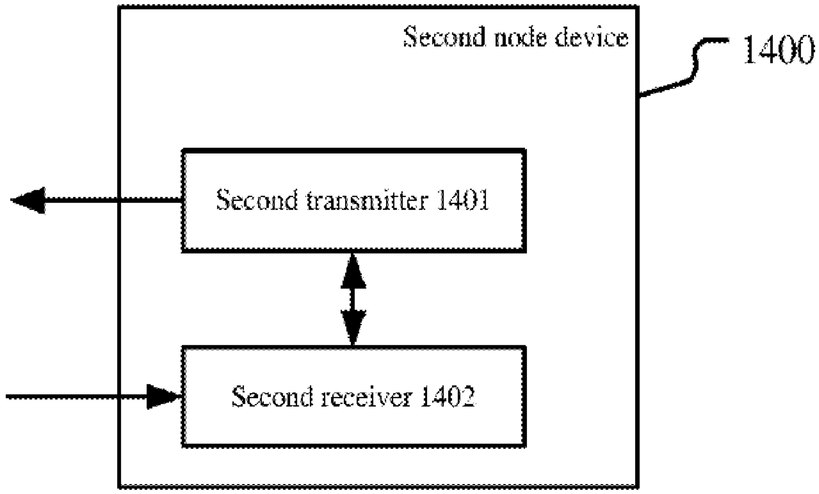
FIG. 14 shows a structural block diagram of a processing device in a second node device according to an embodiment of this application.

Embodiment 14 illustrates a structural block diagram for a processing device in the second node device of one embodiment, as shown in FIG. 14. In FIG. 14, the processing device of the second node device 1400 comprises a second transmitter 1401 and a second receiver 1402.

As an embodiment, the second node device 1400 is a user device.

As an embodiment, the second node device 1400 is a base station.

As an embodiment, the second node device 1400 is a relay node.

As an embodiment, the second node device 1400 is an onboard communication device.

As an embodiment, the second node device 1400 is a user device that supports V2X communication.

As an embodiment, the second transmitter 1401 comprises at least one of the antennas 420, transmitter 418, multi-antenna transmission processor 471, transmission processor 416, controller/processor 475 and memory 476 in FIG. 4 of this application.

As an embodiment, the second transmitter 1401 comprises at least the first five of the antennas 420, transmitter 418, multi-antenna transmission processor 471, transmission processor 416, controller/processor 475 and memory 476 in FIG. 4 of this application.

As an embodiment, the second transmitter 1401 comprises at least the first four of the antennas 420, transmitter 418, multi-antenna transmission processor 471, transmission processor 416, controller/processor 475 and memory 476 in FIG. 4 of this application.

As an embodiment, the second transmitter 1401 comprises at least the first three of the antennas 420, transmitter 418, multi-antenna transmission processor 471, transmission processor 416, controller/processor 475 and memory 476 in FIG. 4 of this application.

As an embodiment, the second transmitter 1401 comprises at least the first two of the antennas 420, transmitter 418, multi-antenna transmission processor 471, transmission processor 416, controller/processor 475 and memory 476 in FIG. 4 of this application.

As an embodiment, the second receiver 1402 comprises at least one of the antennas 420, receiver 418, multi-antenna receiving processor 472, receiving processor 470, controller/processor 475, and memory 476 in FIG. 4 of this application.

As an embodiment, the second receiver 1402 comprises at least the first five of the antennas 420, receiver 418, multi-antenna receiving processor 472, receiving processor 470, controller/processor 475, and memory 476 in FIG. 4 of this application.

As an embodiment, the second receiver 1402 comprises at least the first four of the antennas 420, receiver 418, multi-antenna receiving processor 472, receiving processor 470, controller/processor 475, and memory 476 in FIG. 4 of this application.

As an embodiment, the second receiver 1402 comprises at least the first three of the antennas 420, receiver 418, multi-antenna receiving processor 472, receiving processor 470, controller/processor 475, and memory 476 in FIG. 4 of this application.

As an embodiment, the second receiver 1402 comprises at least the first two of the antennas 420, receiver 418, multi-antenna receiving processor 472, receiving processor 470, controller/processor 475, and memory 476 in FIG. 4 of this application.

As an embodiment, the second transmitter 1401 sends the first signal, and the second receiver 1402 receives the first bit block and the second bit block in the first PUCCH. The first bit block comprises at least one bit, and the second bit block comprises at least one bit. Among them, the resources occupied by the first PUCCH belong to the first resource set, the first resource set belongs to the first resource pool, the first resource pool includes multiple resource sets, and the first signal is used to determine the first resource set from the first resource pool; the first value is equal to the sum of the number of bits included in the first bit block and the number of bits included in the second bit block, the second value is linearly related to the number of bits included in the first bit block, the second value is linearly related to the number of bits included in the second bit block, and the second value is not equal to the first value; and the first and second values are both used to determine the first resource pool.

As an embodiment, the first resource pool is one of N resource pools; the third value is used to determine the first resource pool from the N resource pools; when the first value is not greater than the first reference value, the third value is equal to the first value; when the first value is greater than the first reference value, the third value is equal to the maximum value of the fourth value and the second value, and the fourth value is constant or configurable; N is a positive integer greater than 1, and the first reference value is not less than 2.

As an embodiment, the size relationship between the third value and the M2 reference values is used to determine the first resource pool from the N resource pools. The M2 reference values are different from each other, and M2 is a positive integer greater than 1.

As an embodiment, the first resource pool is one of N resource pools; when the first value is not greater than the first reference value, the first resource pool is the default resource pool among the N resource pools; when the first value is greater than the first reference value, the second value is used to determine the first resource pool from the N resource pools; N is a positive integer greater than 1, and the first reference value is not less than 2.

As an embodiment, when the first value is greater than the first reference value, the size relationship between the second value and the M1 reference values is used to determine the first resource pool from the N resource pools; the M1 reference values are different from each other, the minimum value among the M1 reference values is greater than the first reference value, and M1 is a positive integer.

As an embodiment, when the first value is greater than the first reference value: regardless of whether the second value is greater than the first reference value, the first resource pool is a resource pool other than the default resource pool among the N resource pools.

As an embodiment, the second value is equal to the product of the sum of the number of bits included in the first bit block and the first weight value and the number of bits included in the second bit block. The first weight value is default, configurable, or rate dependent.

As an embodiment, the second bit block is generated from the first HARQ-ACK codebook, and the number of bits included in the second bit block is not equal to the number of HARQ-ACK bits included in the first HARQ-ACK codebook.

As an embodiment, the second transmitter 1401 sends the first signal; and the second receiver 1402 receives the first bit block and the second bit block in the first PUCCH. The first bit block comprises at least one bit, and the second bit block comprises at least one bit; the resources occupied by the first PUCCH belong to the first resource set, the first resource set belongs to the first resource pool, the first resource pool includes multiple resource sets, and the first signal is used to determine the first resource set from the first resource pool; the second value is linearly related to the number of bits included in the first bit block, and the second value is linearly related to the number of bits included in the second bit block; the first resource pool is one of N resource pools, and the third value is related to the second value. The size relationship between the third value and the M2 reference values is used to determine the first resource pool from the N resource pools. The M2 reference values are different from each other, and M2 is a positive integer greater than 1. At least one of the M2 reference values is not an integer.

As a subsidiary embodiment, one of the M2 reference values is greater than 1 and less than 2.

As an embodiment, one of the M2 reference values is equal to 1 plus the first weight value. The first weight value is default, configurable, or rate dependent.

As an embodiment, the third value is the second value.

Those skilled in the art can understand that all or part of the steps in the above methods can be completed by instructing the relevant hardware through a program that can be stored in a computer-readable storage medium, such as any read-only memory, hard disk or optical disk. Optionally, all or part of the steps of the above devices can also be implemented by using one or more integrated circuits. Accordingly, each module unit in the above embodiments can be implemented in the form of hardware or in the form of functional software modules. The application is not limited to any specific form of software and hardware combination. The first node device in this application includes but is not limited to mobile phones, tablet computers, laptops, network cards, low-power devices, eMTC devices, NB IoT devices, on-board communication devices, aircraft, drones, radio-controlled aircraft and other radio communication devices. The second node device in this application includes but is not limited to mobile phones, tablet computers, laptops, network cards, low-power devices, eMTC devices, NB IoT devices, on-board communication devices, aircraft, drones, radio-controlled aircraft and other radio communication devices. The user device or UE or terminal in this application includes but is not limited to mobile phones, tablet computers, laptops, network cards, low-power devices, eMTC devices, NB IoT devices, on-board communication devices, aircraft, drones, radio-controlled aircraft and other radio communication devices. The base station device, base station or network side device in this application includes but is not limited to macro cellular base stations, micro cellular base stations, home base stations, relay base stations, eNB, gNB, transmission and reception node TRPs, GNSS, relay satellites, satellite base stations, air base stations, testing devices, testing instruments and other devices.

Technicians in this field should understand that the invention can be implemented in other designated forms that are not detached from its core or basic features. Therefore, currently disclosed embodiments should be considered as being descriptive rather than restrictive. The scope of the invention is determined by the accompanying claims rather than the previous description, and all modifications within an equivalent meaning and area are included.

What is claimed is:

1. A first node device in wireless communication, comprising:

a first receiver, configured to receive a first signal;

a first transmitter, configured to send a first bit block and a second bit block in a first Physical Uplink Control Channel (PUCCH), wherein the first bit block comprises at least one bit, and the second bit block comprises at least one bit;

wherein resources occupied by the first PUCCH belong to a first resource set, the first resource set belongs to a first resource pool, the first resource pool includes multiple resource sets, and the first signal is used to determine the first resource set from the first resource pool;

a first value is equal to a sum of a number of bits included in the first bit block and a number of bits included in the second bit block, a second value is linearly related to the number of bits included in the first bit block, the second value is linearly related to the number of bits included in the second bit block, and the second value is not equal to the first value; and the first and second values are both used to determine the first resource pool, wherein the second value is equal to the product of the sum of the number of bits included in the first bit block, a first weight value and the number of bits included in the second bit block, the first weight value is default, configurable, or rate dependent.

2. The first node device according to claim 1, wherein the first resource pool is one of N resource pools;

a third value is used to determine the first resource pool from the N resource pools;

when the first value is not greater than a first reference value, the third value is equal to the first value;

when the first value is greater than the first reference value, the third value is equal to the maximum value of the fourth value and the second value, and the fourth value is constant or configurable;

N is a positive integer greater than 1, and the first reference value is not less than 2.

3. The first node device according to claim 2, wherein when the first value is greater than the first reference value, the size relationship between the second value and M1 reference values is used to determine the first resource pool from the N resource pools;

the M1 reference values are different from each other, the minimum value among the M1 reference values is greater than the first reference value, and M1 is a positive integer.

4. The first node device according to claim 1, wherein the first resource pool is one of N resource pools;

when the first value is not greater than the first reference value, the first resource pool is the default resource pool among the N resource pools;

when the first value is greater than the first reference value, the second value is used to determine the first resource pool from the N resource pools;

N is a positive integer greater than 1, and the first reference value is not less than 2.

5. The first node device according to claim 4, wherein when the first value is greater than the first reference value, regardless of whether the second value is greater than the first reference value, and the first resource pool is a resource pool other than the default resource pool among the N resource pools.

6. The first node device according claim 1, wherein the second bit block is generated from a first Hybrid Automatic Repeat Request Acknowledgement (HARQ-ACK) codebook, and the number of bits included in the second bit block is not equal to the number of HARQ-ACK bits included in the first HARQ-ACK codebook.

7. A second node device of wireless communication, comprising:

a second transmitter configured to send a first signal; and a second receiver configured to receive a first bit block and a second bit block in a first Physical Uplink Control Channel (PUCCH), wherein the first bit block comprises at least one bit, and the second bit block comprises at least one bit;

wherein resources occupied by the first PUCCH belong to a first resource set, the first resource set belongs to a first resource pool, the first resource pool includes multiple resource sets, and the first signal is used to determine the first resource set from the first resource pool;

a first value is equal to a sum of a number of bits included in the first bit block and a number of bits included in the second bit block, a second value is linearly related to the number of bits included in the first bit block, the second value is linearly related to the number of bits included in the second bit block, and the second value is not equal to the first value; and the first and second values are both used to determine the first resource pool, wherein the second value is equal to the product of the sum of the number of bits included in the first bit block, a first weight value and the number of bits included in the second bit block, the first weight value is default, configurable, or rate dependent.

8. A method used for the first node in wireless communication, comprising:

receiving a first signal; and sending a first bit block and a second bit block in a first Physical Uplink Control Channel (PUCCH), wherein the first bit block comprises at least one bit, and the second bit block comprises at least one bit;

wherein resources occupied by the first PUCCH belong to a first resource set, the first resource set belongs to a first resource pool, the first resource pool includes multiple resource sets, and the first signal is used to determine the first resource set from the first resource pool;

a first value is equal to a sum of the number of bits included in the first bit block and a number of bits included in the second bit block, a second value is linearly related to the number of bits included in the first bit block, the second value is linearly related to the number of bits included in the second bit block, and the second value is not equal to the first value; and the first and second values are both used to determine the first resource pool, wherein the second value is equal to the product of the sum of the number of bits included in the first bit block, a first weight value and the number of bits included in the second bit block, the first weight value is default, configurable, or rate dependent.

9. A method used for a second node of wireless communication, comprising:

sending a first signal; and receiving a first bit block and a second bit block in a first Physical Uplink Control Channel (PUCCH), wherein the first bit block comprises at least one bit, and the second bit block comprises at least one bit;

wherein resources occupied by the first PUCCH belong to a first resource set, the first resource set belongs to a first resource pool, the first resource pool includes multiple resource sets, and the first signal is used to determine the first resource set from the first resource pool;

a first value is equal to a sum of a number of bits included in the first bit block and a number of bits included in the second bit block, a second value is linearly related to the number of bits included in the first bit block, the second value is linearly related to the number of bits included in the second bit block, and the second value is not equal to the first value; and the first and second values are both used to determine the first resource pool, wherein the second value is equal to the product of the sum of the number of bits included in the first bit block, a first weight value and the number of bits included in the second bit block, the first weight value is default, configurable, or rate dependent.

* * * * *